US012545257B2

(12) United States Patent
You

(10) Patent No.: US 12,545,257 B2
(45) Date of Patent: Feb. 10, 2026

(54) DATA PROCESSING METHOD AND APPARATUS, DEVICE, AND STORAGE MEDIUM

(71) Applicant: Tencent Technology (Shenzhen) Company Limited, Shenzhen (CN)

(72) Inventor: Changxi You, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 605 days.

(21) Appl. No.: 17/970,468

(22) Filed: Oct. 20, 2022

(65) Prior Publication Data
US 2023/0041319 A1 Feb. 9, 2023

Related U.S. Application Data

(63) Continuation of application No. PCT/CN2021/116118, filed on Sep. 2, 2021.

(30) Foreign Application Priority Data

Sep. 17, 2020 (CN) .......................... 202010979552.7

(51) Int. Cl.
*B60W 30/18* (2012.01)
*B60W 50/00* (2006.01)
(Continued)

(52) U.S. Cl.
CPC .. *B60W 30/18163* (2013.01); *B60W 50/0097* (2013.01); *G08G 1/052* (2013.01);
(Continued)

(58) Field of Classification Search
CPC ....... B60W 30/18163; B60W 50/0097; B60W 2520/10; B60W 2552/10;
(Continued)

(56) References Cited

U.S. PATENT DOCUMENTS 10,369,992 B2 8/2019 Ji et al.
10,726,727 B2 7/2020 Nishimura et al.
(Continued)

FOREIGN PATENT DOCUMENTS

CN 105015545 A 11/2015
CN 106248392 A 12/2016
(Continued)

OTHER PUBLICATIONS

Tencent Technology, WO, PCT/CN2021/116118, Dec. 8, 2021, 5 pgs.
(Continued)

*Primary Examiner* — Peter D Nolan
*Assistant Examiner* — Demetra R Smith-Stewart
(74) *Attorney, Agent, or Firm* — Morgan, Lewis & Bockius LLP

(57) ABSTRACT

This application provides a data processing method performed a computer device. The method includes: generating an initial predicted lane change acceleration corresponding to a target vehicle in a current lane; generating target predicted position information corresponding to the target vehicle according to a predicted lane change time duration taken for the target vehicle to change from the current lane to a target lane, the target lane being a lane to which the target vehicle is expected to change to; determining a target obstacle vehicle in the target lane and adjacent to the target vehicle according to the target predicted position information; determining, according to a predicted position relationship between the target obstacle vehicle and the target vehicle, a target predicted lane change acceleration; and controlling, according to the target predicted lane change acceleration, the target vehicle to change from the current lane to the target lane.

20 Claims, 10 Drawing Sheets

(51) Int. Cl.
  *G08G 1/052* (2006.01)
  *G08G 1/16* (2006.01)
(52) U.S. Cl.
  CPC ......... *G08G 1/167* (2013.01); *B60W 2520/10* (2013.01); *B60W 2552/10* (2020.02); *B60W 2554/4041* (2020.02); *B60W 2554/802* (2020.02); *B60W 2720/106* (2013.01)
(58) Field of Classification Search
  CPC ... B60W 2554/4041; B60W 2554/802; B60W 2720/106; B60W 60/001; G08G 1/052; G08G 1/167; G08G 1/096775; G08G 1/096708; G08G 1/096791; G08G 1/096725; H04W 4/46
  See application file for complete search history.

(56) References Cited

U.S. PATENT DOCUMENTS

| | | | |
|---|---|---|---|
| 2011/0130936 | A1 | 6/2011 | Noda |
| 2017/0242435 | A1 | 8/2017 | Nilsson et al. |
| 2018/0178796 | A1 | 6/2018 | Fukuda et al. |
| 2018/0339708 | A1 | 11/2018 | Geller |
| 2019/0308617 | A1 | 10/2019 | Groult et al. |
| 2019/0329777 | A1* | 10/2019 | Rajab ............... B60W 40/04 |
| 2020/0180636 | A1 | 6/2020 | Oh et al. |
| 2020/0189590 | A1* | 6/2020 | Luo ............... G06N 3/08 |
| 2021/0061294 | A1* | 3/2021 | Doemling ........... G06N 3/045 |
| 2022/0073098 | A1* | 3/2022 | D'Orazio .......... B60W 50/14 |

FOREIGN PATENT DOCUMENTS

| | | | | |
|---|---|---|---|---|
| CN | 108133610 | A | | 6/2018 |
| CN | 109035863 | A | | 12/2018 |
| CN | 110136484 | A | | 8/2019 |
| CN | 111081046 | A | | 4/2020 |
| CN | 111231952 | A | | 6/2020 |
| CN | 111439261 | A | | 7/2020 |
| CN | 111661055 | A | | 9/2020 |
| CN | 111986514 | A | | 11/2020 |
| CN | 112918478 | A | * | 6/2021 ........... B60W 10/20 |
| JP | 2014061792 | A | | 4/2014 |
| JP | 2015174494 | A | | 10/2015 |

OTHER PUBLICATIONS

Tencent Technology, IPRP, PCT/CN2021/116118, Mar. 21, 2023, 6 pgs.
Tencent Technology, European Office Action, EP Patent Application No. 21868457.9, Feb. 11, 2025, 8 pgs.
Tencent Technology, Extended European Search Report and Supplementary Search Report, EP Application No. 21868457.9, Feb. 27, 2024, 8 pgs.
Tencent Technology, Japanese Office Action, JP Application No. 2022566630, Oct. 31, 2023, 10 pgs.
Tencent Technology, ISR, PCT/CN2021/116118, Dec. 8, 2021, 3 pgs.

* cited by examiner

DATA PROCESSING METHOD AND APPARATUS, DEVICE, AND STORAGE MEDIUM

CROSS-REFERENCE TO RELATED APPLICATIONS

This application is a continuation application of PCT Patent Application No. PCT/CN2021/116118, entitled "DATA PROCESSING METHOD AND APPARATUS, DEVICE, AND STORAGE MEDIUM" filed on Sep. 2, 2021, which claims priority to Chinese Patent Application No. 202010979552.7, filed with the State Intellectual Property Office of the People's Republic of China on Sep. 17, 2020, and entitled "VEHICLE-BASED DATA PROCESSING METHOD AND APPARATUS, DEVICE, AND MEDIUM", all of which are incorporated herein by reference in their entirety.

This application relates to U.S. patent application Ser. No. 17/971,495, entitled "VEHICLE-BASED DATA PROCESSING METHOD AND APPARATUS, COMPUTER, AND STORAGE MEDIUM" filed on Oct. 21, 2022, which is incorporated herein by reference in its entirety.

FIELD OF THE TECHNOLOGY

This application relates to the technical field of intelligent driving, and in particular, to a data processing method and apparatus, a device, and a medium.

BACKGROUND OF THE DISCLOSURE

A driverless vehicle is an intelligent vehicle that senses a road environment through an in-vehicle sensor system, automatically plans a driving route, and controls the vehicle to reach a predetermined destination. The driverless vehicle may achieve a purpose of autonomous driving by relying on a computer-system-based intelligent pilot in the vehicle.

In the related art, when changing lanes, the driverless vehicle generally requires surrounding vehicles to cooperate and give way in order to obtain enough lane change space and realize safe lane change of the driverless vehicle. However, in congestion scenarios, the surrounding vehicles cannot cooperate with and give way to the driverless vehicle. As a result, the driverless vehicle cannot find a suitable lane change opportunity, which leads to failure in the lane change of the driverless vehicle.

SUMMARY

An embodiment of this application provides a data processing method, performed by a computer device, the method including:
  generating an initial predicted lane change acceleration corresponding to a target vehicle according to driving parameters of the target vehicle in a current lane;
  generating target predicted position information corresponding to the target vehicle according to current position information, a predicted lane change time duration, and the initial predicted lane change acceleration of the target vehicle, the predicted lane change time duration being an estimated time duration taken for the target vehicle to change from the current lane to a target lane, the target lane being a lane to which the target vehicle is expected to change to;
  determining a target obstacle vehicle in the target lane corresponding to the target vehicle according to the target predicted position information, the target obstacle vehicle being a vehicle in the target lane and adjacent to the target vehicle after the expected lane change;
  updating the initial predicted lane change acceleration to be a target predicted lane change acceleration for instructing the target vehicle to change from the current lane to the target lane according to a predicted position relationship between the target obstacle vehicle and the target vehicle; and
  controlling, according to the target predicted lane change acceleration, the target vehicle to change from the current lane to the target lane.

An embodiment of this application provides a data processing apparatus, including:
  an initial acceleration determination module configured to generate an initial predicted lane change acceleration corresponding to a target vehicle according to driving parameters of the target vehicle in a current lane;
  a position prediction module configured to generate target predicted position information corresponding to the target vehicle according to current position information, a predicted lane change time duration, and the initial predicted lane change acceleration of the target vehicle, the predicted lane change time duration being an estimated time duration taken for the target vehicle to change from the current lane to a target lane, the target lane being a lane to which the target vehicle is expected to change to;
  a target obstacle determination module configured to determine a target obstacle vehicle in the target lane corresponding to the target vehicle according to the target predicted position information, the target obstacle vehicle being a vehicle in the target lane and adjacent to the target vehicle after the expected lane change; and
  a target acceleration determination module configured to update the initial predicted lane change acceleration to be a target predicted lane change acceleration for instructing the target vehicle to change from the current lane to the target lane according to a predicted position relationship between the target obstacle vehicle and the target vehicle; and control, according to the target predicted lane change acceleration, the target vehicle to change from the current lane to the target lane.

An aspect of the embodiments of this application provides a computer device, including a memory and a processor, the memory storing a computer program, the computer program, when executed by the processor, causing the computer device to perform the steps of the method in one aspect of the embodiments of this application.

An aspect of the embodiments of this application provides a non-transitory computer-readable storage medium, storing a computer program, the computer program including program instructions, the program instructions, when executed by a processor of a computer device, causing the computer device to implement the steps of the method in one aspect of the embodiments of this application.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium, and the processor executes the computer instructions, so that the computer device performs the method in the various implementations of one aspect described above.

BRIEF DESCRIPTION OF THE DRAWINGS

To describe the technical solutions of the embodiments of this application or the related art more clearly, the following briefly introduces the accompanying drawings required for describing the embodiments or the related art. The accompanying drawings in the following description show merely some embodiments of this application, and a person of ordinary skill in the art may still derive other drawings from these accompanying drawings without creative efforts.

DESCRIPTION OF EMBODIMENTS

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

This application relates to driverless vehicles (also referred to as wheeled mobile robots or autonomous vehicles) in intelligent driving technologies. A driverless vehicle is an intelligent vehicle that senses a road environment through an in-vehicle sensor system, automatically plans a driving route, and controls the vehicle to reach a predetermined destination. The driverless vehicle may use an in-vehicle sensor to sense environments around the vehicle, and control the vehicle's steering and speed according to sensed roads, vehicle positions, and obstacle information, so that the vehicle can safely and reliably travel on the roads. The driverless vehicle integrates many technologies such as automatic control, system architecture, artificial intelligence, and vision computing, and is a highly developed product of computer science, pattern recognition, and intelligent control technologies.

In congestion scenarios, if the surrounding vehicles cannot cooperate with and give way to the driverless vehicle, the driverless vehicle cannot find a suitable lane change opportunity, which leads to failure in the lane change of the driverless vehicle. Based on this, embodiments of this application provide a vehicle lane change method and apparatus, a device, and a medium, which can improve a lane change success rate of a vehicle.

Figure 1A:
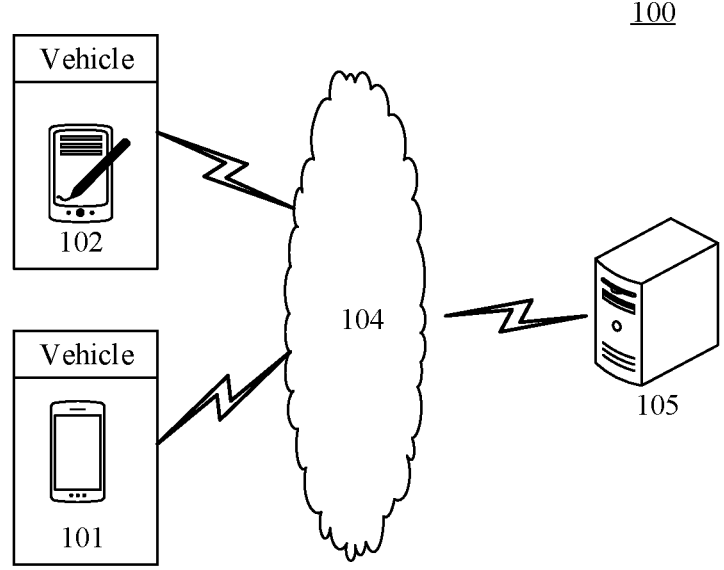
FIG. 1A is a diagram of a system architecture to which a data processing method according to an embodiment of this application applies.

FIG. 1A is a system architecture 100 to which a vehicle lane change method according to an embodiment of this application applies. As shown in FIG. 1A, a system architecture 100 may include one or more of terminal devices 101 and 102, a network 104, and a server 105. The network 104 is configured to provide a medium of a communication link between the server 105 and the terminal devices 101 and 102. The network 104 may include various connection types, such as a wired or wireless communication link, or a fiber optic cable. The terminal devices 101 and 102 may be a variety of computing devices having displays and mounted or configured on conventional vehicles, including, but not limited to, computers, smart phones, tablet computers, and the like. There may be any quantities of terminal devices, networks, and servers according to an implementation requirement. For example, the server 105 may be a server cluster including a plurality of servers.

The vehicle lane change method according to this embodiment of this application is generally performed by the terminal devices 101 and 102. However, it is easy for a person skilled in the art to understand that the vehicle lane change method according to this embodiment of this application may also be performed by the server 105, which is not specially limited in this exemplary embodiment.

Figure 1B:
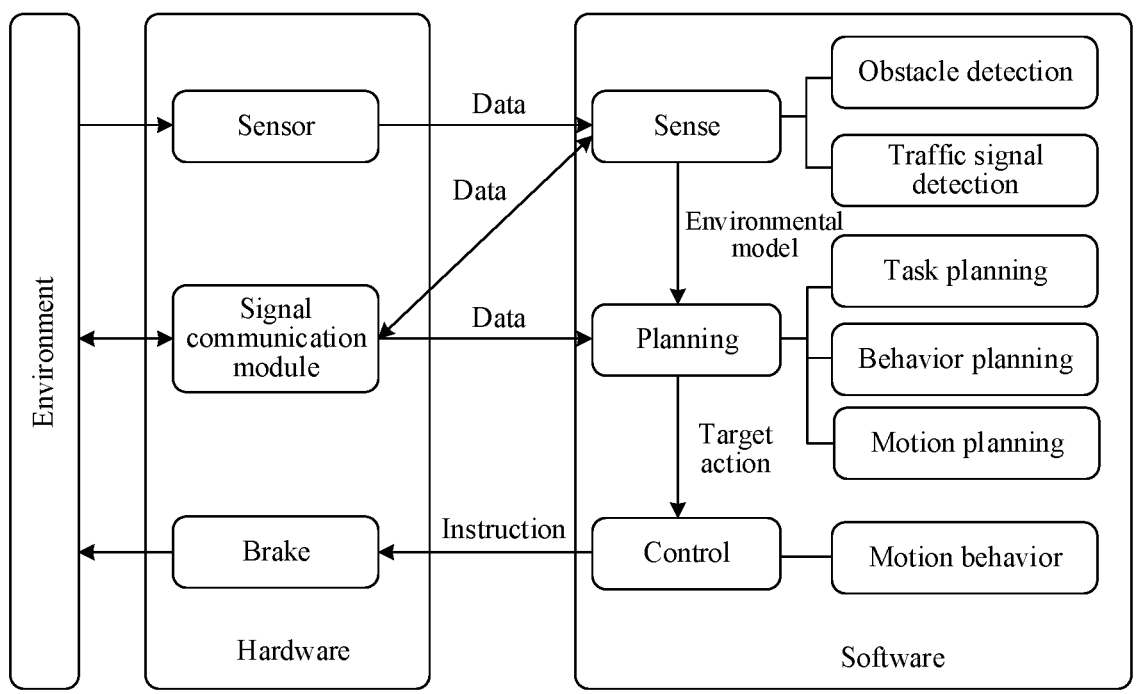
FIG. 1B is a schematic structural diagram of an intelligent driving system according to an embodiment of this application.

Referring to FIG. 1B, FIG. 1B is a schematic structural diagram of an intelligent driving system according to an embodiment of this application. As shown in FIG. 1B, the intelligent driving system is generally mounted on a conventional vehicle to build the whole system. The intelligent driving system may include a hardware part and a software part. The hardware part may include a sensor, a signal communication module, a brake, and the like. The software part may include a sensing module, a planning module, a control module, and the like, which may be mounted in the terminal device 101 or the terminal device 102 shown in FIG. 1A.

The sensor may be configured to acquire a lot of information about surroundings, such as positions, speeds, and possible behaviors of obstacles (the obstacles herein may refer to other vehicles, pedestrians, cones, guardrails, etc. around the driverless vehicle), travelable regions, and traffic rules. The sensor may include, but is not limited to, a camera, a lidar, and a millimeter wave radar. The camera may be configured to acquire image information, and may identify pedestrians, cars, trees, traffic lights, signal boards, and so on from the image information through the sensing module of the software part. That is, obstacles and traffic signals may be detected according to the image information. The lidar may be configured to acquire laser scanning reflection data, and may identify obstacles such as pedestrians, cars, and trees from the laser scanning reflection data through the sensing module. That is, obstacles may be detected according to the laser scanning reflection data. The millimeter wave radar may be configured to acquire reflection data, may identify obstacles and measure distances according to the reflection data, and may achieve a purpose of assisting obstacle avoidance. In other words, the intelligent driving system may sense surroundings of the driverless vehicle in real time according to data acquired by the sensor.

In order to achieve a certain goal, the planning module may make some purposeful decisions for the driverless vehicle. For the driverless vehicle, the goal generally refers to getting from an origin to a destination and avoiding obstacles, and constantly optimizing driving trajectories and behaviors to ensure safety and comfort of passengers. Planning may include task planning, behavior planning, and motion planning. Path planning may also be referred to as routing. A role of the task planning may be simply understood as navigation inside the intelligent driving system, that is, to guide, on a macro level, the driverless vehicle to travel from a starting point to a destination point according to a road. The behavior planning is also referred to as decision making. The behavior planning may be responsible for determining next decision to be executed by the driverless vehicle according to a goal of the path planning and a current local situation (e.g., positions and behaviors of other vehicles and pedestrians, current traffic rules, etc.). The behavior planning may be understood as a co-driver of the vehicle, which directs, according to a goal and a current traffic situation, a driver whether to follow or overtake, stop and wait for pedestrians to pass or bypass pedestrians, and the like. The motion planning may include path planning and speed planning. A role of the motion planning may be understood as specifically solving the problem of how the driverless vehicle travels from a point A to a point B in a small spatio-temporal region. For example, an intermediate waypoint from the point A to the point B within a short time t may be planned, including selecting specific waypoints, and a speed, an orientation, and an acceleration of the driverless vehicle when the driverless vehicle reaches each waypoint.

The control module is the lowest level of the intelligent driving system and may be configured to implement the above planned behaviors (e.g., obstacle avoidance, lane change, etc.). The control module may transmit an execution instruction to the brake of the hardware part to control execution of power (throttle and gear), chassis (steering and braking) and electronic and electrical systems of the driverless vehicle, so as to realize the control over a speed and a direction of the driverless vehicle.

The signal communication module may include vehicle-to-vehicle (V2V) communication. The V2V communication refers to wireless-based data transmission between motor vehicles. To prevent accidents, the V2V communication transmits vehicle positions and speed information to other vehicles via a dedicated network. The signal communication module may exchange data with the sensing module. Vehicle positions and speed information of the other vehicles may be sensed in real time through the sensing module. In addition, vehicle positions and speed information of the current driverless vehicle may also be transmitted to the other vehicles through the signal communication module. The sensing module of the driverless vehicle may take autonomous measures, such as braking and deceleration, based on the information received.

This application relates to the behavior planning in the intelligent driving system, and mainly to the issue of speed planning in lane change in driverless congestion scenarios.

Figure 2A:
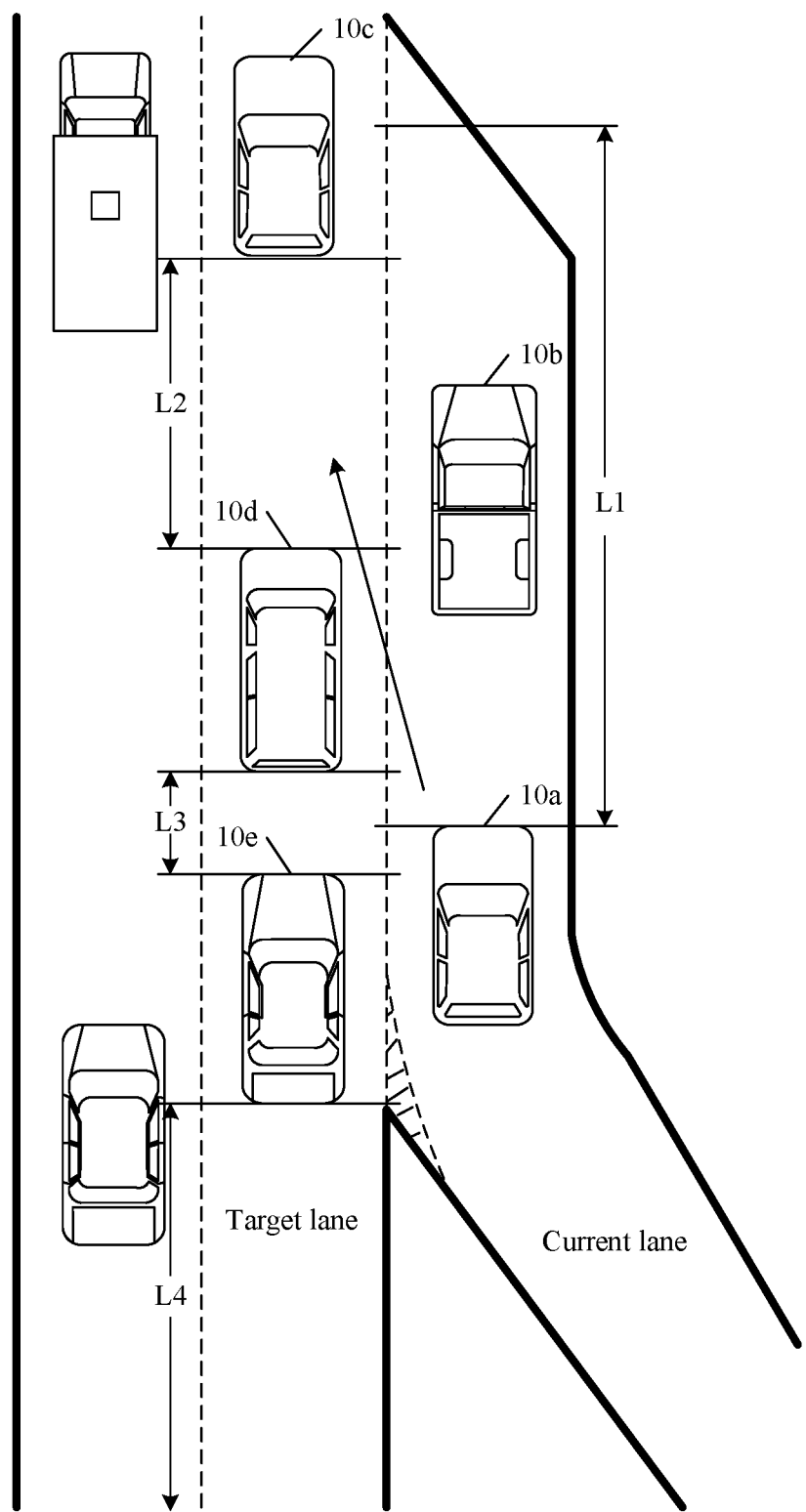
FIG. 2A and FIG. 2B are schematic diagrams of lane change scenarios of a driverless vehicle according to an embodiment of this application.
Figure 2B:
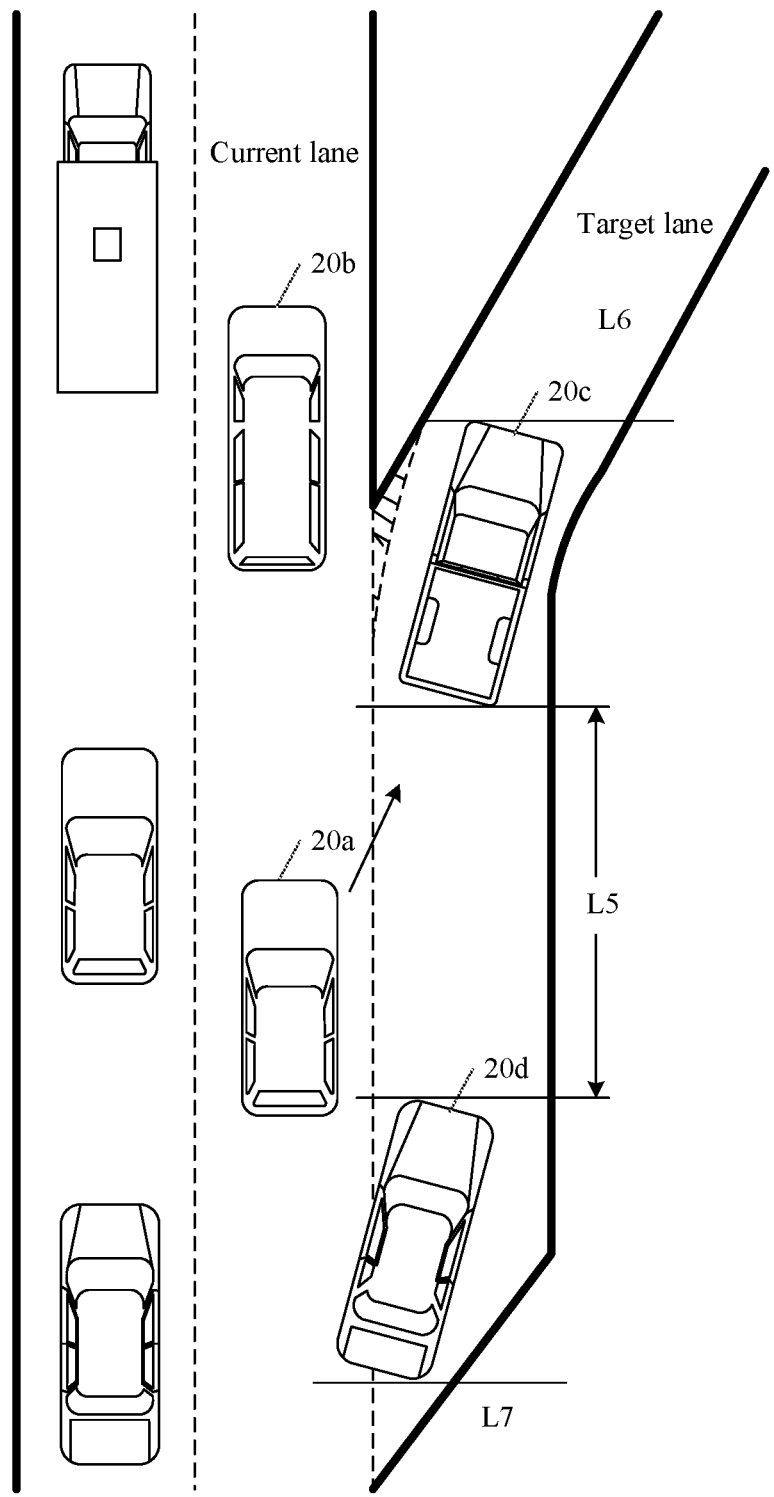

Referring to FIG. 2A and FIG. 2B together, FIG. 2A and FIG. 2B are schematic diagrams of lane change scenarios of a driverless vehicle according to an embodiment of this application. Taking a scenario in which a driverless vehicle joins a highway or a main road as an example, a vehicle 10a shown in FIG. 2A is the driverless vehicle. When the vehicle 10a is located at an entrance to the highway or main road, the vehicle 10a has to change lanes to join the highway or main road. A vehicle 10b shown in FIG. 2A refers to a leader traveling in the same lane as the vehicle 10a and in front of the vehicle 10a (the vehicle 10b and the vehicle 10a are adjacent vehicles in a current lane). A vehicle 10c, a vehicle 10d, and a vehicle 10e are vehicles traveling in a target lane respectively. For the vehicle 10a that is about to change lanes, the vehicle 10c, the vehicle 10d, and the vehicle 10e are obstacles.

As shown in FIG. 2A, a travelable region of the vehicle 10a in the current lane is a region L1. That is, the vehicle 10a needs to change to the target lane before traveling to an endpoint of the region L1 to prevent collision. During the lane change, the vehicle 10a may choose, according to a length of the region L1 in the current lane, a driving speed of the vehicle 10a, a driving speed of the vehicle 10b, and speeds and positions of moving vehicles in the target lane (e.g., positions and speeds of the vehicle 10c, the vehicle 10d, and the vehicle 10e in the target lane), a proper lane change gap from the target lane, that is, choose to jam between which two vehicles in the target lane. As shown in FIG. 2A, the target lane has 4 gaps for the vehicle 10a to select. The 4 gaps are a front region of the vehicle 10c, a region L2 between the vehicle 10c and the vehicle 10d, a region L3 between the vehicle 10d and the vehicle 10e, and a rear region L4 of the vehicle 10e respectively.

If the vehicle 10a selects the region L2 as a gap for the lane change, the vehicle 10a further needs to perform speed planning according to information such as a spacing distance between the vehicle 10c and the vehicle 10d, a safe distance between vehicles, and driving speeds respectively corresponding to the vehicle 10c and the vehicle 10d. A safe lane change from the current lane to the target lane is realized by changing the speed of the vehicle 10a.

When the driverless vehicle is located at the entrance to the highway or main road, a vehicle 20a shown in FIG. 2B is the driverless vehicle that is about to change lanes to exit the highway or main road. That is, the vehicle 20a needs to change from the current lane to the target lane to achieve a purpose of exiting the highway or main road. As shown in FIG. 2B, the vehicle 20b refers to a leader traveling in the same lane as the vehicle 20a and in front of the vehicle 20a (the vehicle 20b and the vehicle 20a are adjacent vehicles in a current lane). A vehicle 20c and a vehicle 20d are vehicles traveling in the target lane respectively. For the vehicle 20a that is about to change lanes, the vehicle 20c and the vehicle 20d are obstacles.

During the lane change, the vehicle 20a first needs to choose a proper lane change gap from the target lane, that is, choose to jam between which two vehicles in the target lane. The vehicle 20a may choose the proper lane change gap from the target lane according to information such as a driving speed of the vehicle 20a, a driving speed of the vehicle 20b, a driving speed of the vehicle 20c, and a driving speed of the vehicle 20d. As shown in FIG. 2B, the target lane has 3 gaps for the vehicle 20a to select. The 3 gaps are a front region L6 of the vehicle 20c (in practical applications, the vehicle 20c herein has completely exited the highway or main road and is already traveling in the target lane, so the region L6 herein can be ignored), a region L5 between the vehicle 20c and the vehicle 20d, and a rear region L7 of the vehicle 20d respectively.

If the vehicle 20a selects the region L5 as a gap for the lane change, the vehicle 20a further needs to perform speed planning according to information such as a spacing distance between the vehicle 20c and the vehicle 20d, a safe distance between vehicles, and driving speeds respectively corresponding to the vehicle 20c and the vehicle 20d. A safe lane change from the current lane to the target lane is realized by changing the speed of the vehicle 20a.

A specific process of performing speed planning on the vehicle 10a and the vehicle 20a may be obtained with reference to embodiments corresponding to FIG. 3 to FIG. 6 below.

Figure 3:
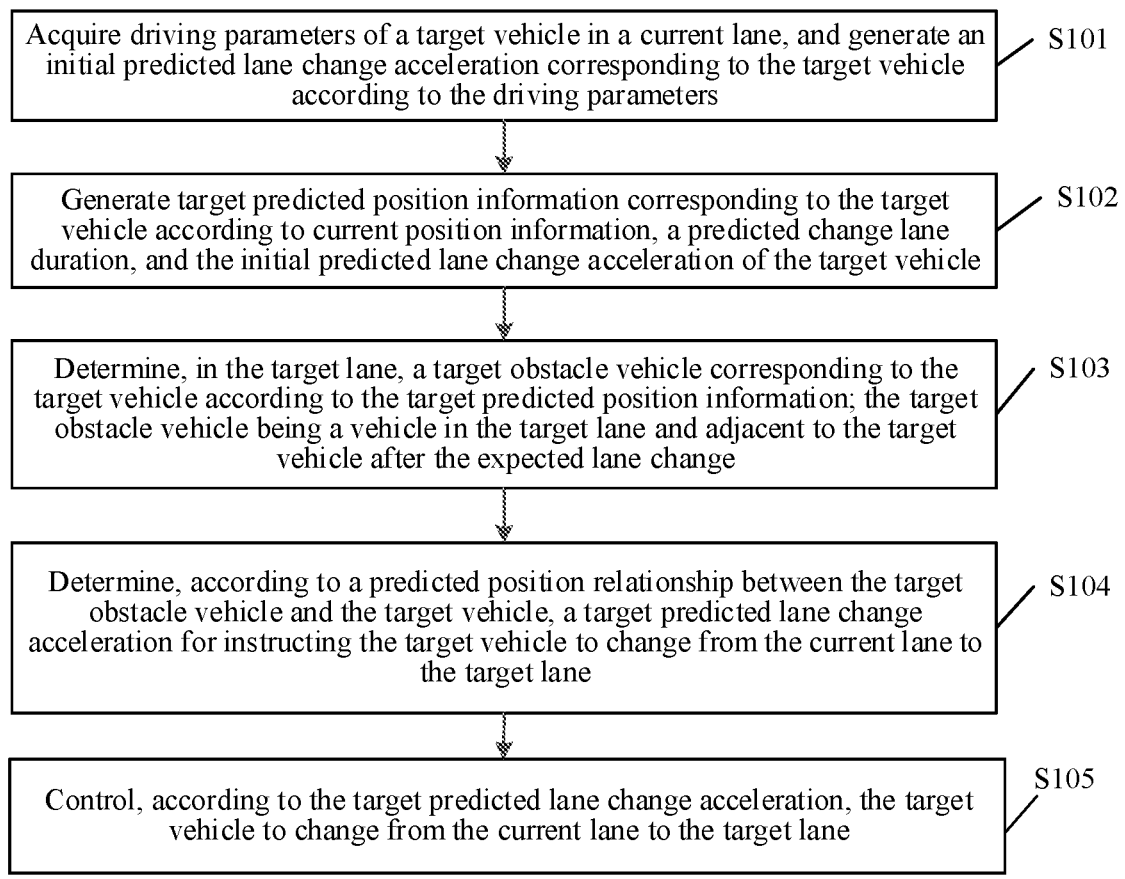
FIG. 3 is a schematic flowchart of a data processing method according to an embodiment of this application.

Further, referring to FIG. 3, FIG. 3 is a schematic flowchart of a data processing method according to an embodiment of this application. The method is performed by a computer device. The computer device may be a terminal device shown in FIG. 1A or a server 105 in FIG. 1A. As shown in FIG. 3, the data processing method may include the following steps.

Step S101. Acquire driving parameters of a target vehicle in a current lane, and generate an initial predicted lane change acceleration corresponding to the target vehicle according to the driving parameters.

Specifically, the intelligent driving system may perform coarse speed planning according to driving parameters (also referred to as environmental conditions of the target vehicle) of the target vehicle (i.e., a driverless vehicle needing to change lanes, such as the vehicle 10a in the embodiment corresponding to FIG. 2A, which may be referred to as an Ego car) to generate the initial predicted lane change acceleration corresponding to the target vehicle. The driving parameters may include a maximum target lane speed $v_m$, a leading car (also referred to as a leader), and a road passing distance $L_m$ (m). The maximum target lane speed $v_m$ refers to a maximum speed specified in the target lane. The target lane refers to a lane to which the target vehicle is expected to change. For example, when the target lane is a lane in an expressway, the maximum target lane speed $v_m$ may be 120 m/s which is the maximum speed specified in the expressway. The leading car refers to a vehicle guiding a driving route for the target vehicle in the current lane, that is, an environmental vehicle in the current lane and traveling in front of and closest to the target vehicle. The road passing distance $L_m$ refers to a length of a passable road in the current lane for the target vehicle, for example, a length of the region L1 in the embodiment corresponding to FIG. 2A.

Further, the intelligent driving system may acquire a current driving speed $v_1$ of the target vehicle, and determine a first limited acceleration $a_1$ corresponding to the target vehicle according to the driving speed $v_1$ and the maximum target lane speed $v_m$. The first limited acceleration $a_1$ may be expressed as:

$$a_1 = \begin{cases} a_{max}, & v_1 < v_m - 2.0 \\ 0.5, & (v_m - 2.0) \le v_1 < (v_m - 0.5) \\ 0, & (v_m - 0.5) \le v_1 < (v_m + 0.5) \\ -(v_1 - v_m)/3.0, & v_1 \ge (v_m + 0.5) \end{cases} \quad (1)$$

where $a_{max}$ is used for denoting a maximum acceleration designed by the target vehicle, i.e., a maximum value of the first limited acceleration $a_1$ is $a_{max}$. The equation (1) is a piecewise function representation of the first limited acceleration $a_1$, and a consideration factor in the equation (1) is a current traffic flow speed of the target lane. When the driving speed $v_1$ of the target vehicle is less than a difference between the maximum target lane speed $v_m$ and 2.0, the first limited acceleration $a_1$ may be designed to be the maximum acceleration $a_{max}$ (m/s²). When the driving speed $v_1$ of the target vehicle is less than a difference between the maximum target lane speed $v_m$ and 0.5 and greater than or equal to the difference between the maximum target lane speed $v_m$ and 2.0, the first limited acceleration $a_1$ may be designed to be 0.5 m/s². When the driving speed $v_1$ of the target vehicle is less than a sum of the maximum target lane speed $v_m$ and 0.5 and greater than or equal to the difference between the maximum target lane speed $v_m$ and 0.5, the first limited acceleration $a_1$ may be designed to be 0. That is, the driving speed $v_1$ is continued for uniform motion. When the driving speed $v_1$ of the target vehicle is greater than or equal to the sum of the maximum target lane speed $v_m$ and 0.5, the first limited acceleration $a_1$ may be designed to be $-(v_1-v_m)/3.0$.

In the embodiments of this application, all the driving speeds referred to may be instantaneous speeds in units of m/s, all the accelerations referred to are in units of m/s², and all the distances referred to are in units of m. Details are not described in the subsequent description.

In some embodiments, in the lane change scenario, the intelligent driving system further needs to consider the influence of the road passing distance $L_m$. The target vehicle remains traveling in the current lane when the target vehicle searches for the right time to change lanes. When the target vehicle does not find a suitable lane change opportunity and gradually approaches the endpoint of the current lane, the intelligent driving system needs to control the target vehicle to slow down. Therefore, the intelligent driving system may generate a braking acceleration $a_r$ corresponding to the target vehicle according to the driving speed $v_1$ and the road passing distance $L_m$, and determine a second limited acceleration $a_2$ corresponding to the target vehicle according to the braking acceleration $a_r$.

The braking acceleration $a_r$ may refer to an acceleration used by the target vehicle to slow down. The intelligent driving system may acquire a road endpoint speed $v_{min}$ of the target vehicle in the current lane, and acquire a square difference between the driving speed $v_1$ and the road endpoint speed $v_{min}$. The road endpoint speed $v_{min}$ is a minimum speed at which the target vehicle travels to the endpoint of the current lane. For example, the road endpoint speed may be a minimum speed at which the target vehicle travels to the endpoint of the current lane when the target vehicle is located at an entrance to a highway or main road and needs to join the main road. Alternatively, in another example, the road endpoint speed may be a minimum speed at which the target vehicle exits the highway or main road or the target vehicle travels to an exit from a current road (for example, the road endpoint speed $v_{min}$ may be 3.0 m/s, or the road endpoint speed $v_{min}$ may be 0, or the road endpoint speed $v_{min}$ may be a preset constant parameter). Then, the braking acceleration $a_r$ corresponding to the target vehicle may be determined according to a ratio of the square difference to the road passing distance $L_m$. The braking acceleration $a_r$ may be expressed as:

$$a_r = -(v_1^2 - v_{min}^2)/2L_m \quad (2)$$

The braking acceleration $a_r$ may be calculated according to the equation (2). The second limited acceleration $a_2$ may be expressed as:

$$a_2 = \begin{cases} -1.0, & a_r < -1.0 \\ -.05, & -1.0 \le a_r < -0.5 \\ 0, & -0.5 \le a_r < 0 \\ a_{max}, & a_r \ge 0 \end{cases} \quad (3)$$

The equation (3) is a piecewise function representation of the second limited acceleration $a_2$. When the braking acceleration $a_r$ is less than −1.0 m/s², the second limited acceleration $a_2$ may be designed to be −1.0 m/s². When the braking acceleration $a_r$ is less than $-0.5$ m/s² and greater than or equal to $-1.0$ m/s², the second limited acceleration $a_2$ may be designed to be $-0.5$ m/s². When the braking acceleration $a_r$ is less than 0 and greater than or equal to $-0.5$ m/s², the second limited acceleration $a_2$ may be designed to be 0. That is, the driving speed $v_1$ is continued for uniform motion. When the braking acceleration $a_r$ is greater than or equal to 0, the second limited acceleration $a_2$ may be designed to be $a_{max}$.

In some embodiments, in the lane change scenario, the intelligent driving system further needs to consider the influence of the leading car in the current lane. When a leading car exists in the current lane for the target vehicle, the target vehicle may have to take more radical measures (such as shortening a following distance with the leading car) to accelerate the lane change in order to realize the lane change. Therefore, the intelligent driving system may acquire a driving speed $v_2$ of the leading car, determine a first safe braking distance $L_{b1}$ corresponding to the target vehicle according to the driving speed $v_2$, and then determine a third limited acceleration $a_3$ corresponding to the target vehicle according to the first safe braking distance $L_{b1}$, the driving speed $v_1$, a target following speed $v_f$, and an estimated following duration $t_f$. The target following speed $v_f$ is a smaller value of the maximum target lane speed $v_m$ and the driving speed $v_2$, i.e., $v_f$=min $(v_2, v_m)$. The estimated following duration $t_f$ is a preset constant parameter (e.g., $t_f$=3-4 s) and used for estimating a duration in which the target vehicle follows the leading car in the current lane. The first safe braking distance $L_{b1}$ may be used for representing a distance that can be traveled by the target vehicle in the current lane while keeping a safe following distance from the leading car.

A process of determining the first safe braking distance $L_{b1}$ may include: acquiring, by the intelligent driving system, a first following time interval $t_{h1}$ (the first following time interval $t_{h1}$ may be a preset constant parameter and used for representing a duration in which the target vehicle at the current driving speed $v_1$ keeps a minimum safe distance from the leading car, e.g., $t_{h1}$=0.5–0.8 s) between the target vehicle and the leading car, and determining a target following distance according to the target following speed $v_f$ and the first following time interval $t_{h1}$; and acquiring a spacing distance $l_1$ (a spacing distance at the current time) between the target vehicle and the leading car, and determining a difference between the spacing distance $l_1$ and the target following distance as the first safe braking distance $L_{b1}$. The first safe braking distance $L_{b1}$ may be expressed as:

$$L_{b1}=l_1-v_f^* t_{h1} \quad (4)$$

The first safe braking distance $L_{b1}$ may be calculated from the equation (4). In this case, the third limited acceleration $a_3$ may be expressed as:

$$a_3=2[L_{b1}-(v_1-v_f)^* t_f]/t_f^2 \quad (5)$$

After obtaining the first limited acceleration $a_1$, the second limited acceleration $a_2$, and the third limited acceleration $a_3$, the intelligent driving system may determine a minimum value of the first limited acceleration $a_1$, the second limited acceleration $a_2$, and the third limited acceleration $a_3$ as the initial predicted lane change acceleration $a_0'$ corresponding to the target vehicle, i.e., $a_0'$=min $(a_1, a_2, a_3)$.

Step S102. Generate target predicted position information corresponding to the target vehicle according to current position information, a predicted lane change time duration, and the initial predicted lane change acceleration of the target vehicle.

Specifically, the intelligent driving system may estimate a relative position relationship between the target vehicle and a surrounding obstacle vehicle after a future period of time (e.g., 3-5 s) according to the initial predicted lane change acceleration, and may select an appropriate lane change gap for lane change preparations according to the relative position relationship. 3-5 s may be expressed as the predicted lane change time duration, that is, a duration taken by the target vehicle to change from the current lane to the target lane. The intelligent driving system may acquire current position information of the target vehicle, and determine target predicted position information of the target vehicle after the predicted lane change time duration according to the current position information, the predicted lane change time duration, and the initial predicted lane change acceleration 4. The target predicted position information may be expressed as:

$$s(t_p)=s(t_0)+v_1 t_p+a_0' t_p^2/2 \quad (6)$$

where $s(t_p)$ in the equation (6) denotes the target predicted position information corresponding to the target vehicle, $s(t_0)$ denotes the current position information of the target vehicle, and $t_p$ denotes the predicted lane change time duration.

The position information (including the current position information and the target predicted position information, and predicted position information of an obstacle vehicle mentioned later) referred to in this embodiment of this application may refer to coordinate information expressed by a Cartesian coordinate system or coordinate information expressed by a Frenet coordinate system. The Frenet coordinate system is a way of representing positions of a road more intuitively than conventional x, y Cartesian coordinate systems. In the Frenet coordinate system, positions of the vehicle on the road may be described using variables s and d, the s coordinate represents a distance along the road (also referred to as a longitudinal position), and the d coordinate represents a left-right position on the road (also referred to as a transverse position). In this embodiment of this application, the Frenet coordinate system is taken as an example to describe position information of the target vehicle and the obstacle vehicle. The position information in this embodiment of this application may refer to longitudinal position information in the Frenet coordinate system, i.e., the distance along the road.

Step S103. Determine, in the target lane, a target obstacle vehicle corresponding to the target vehicle according to the target predicted position information; the target obstacle vehicle being a vehicle in the target lane and adjacent to the target vehicle after the expected lane change.

Specifically, the intelligent driving system may acquire obstacle vehicles in an environment around the target vehicle, estimate predicted distances between the obstacle vehicles and the target vehicle after the predicted lane change time duration $t_p$, and then determine a target obstacle vehicle corresponding to the target vehicle in the target lane. The target obstacle vehicle may refer to a vehicle in the target lane and adjacent to the target vehicle after the expected lane change.

Further, the intelligent driving system may acquire, from the target lane, vehicle driving speeds respectively corresponding to N traffic vehicles within a reference distance range, and determine predicted position information respectively corresponding to the N traffic vehicles according to the vehicle driving speeds and the predicted lane change time duration. N is a positive integer. Then, the intelligent driving system may acquire predicted distances between the target vehicle and the N traffic vehicles respectively according to the target predicted position information and the predicted position information respectively corresponding to the N traffic vehicles, and determine one or more traffic vehicles at a minimum predicted distance from the target vehicle as the target obstacle vehicle corresponding to the target vehicle. It may be understood that the intelligent driving system acquires the predicted position information of the obstacle vehicle to select an appropriate lane change gap. Since the target vehicle needs to change from the current lane to the target lane, the intelligent driving system may acquire only relevant information (including driving speeds, current positions, predicted positions after the predicted lane change time duration, etc.) of the N traffic vehicles within the reference distance range of the target lane. The reference distance range herein may refer to a determined range of the target obstacle vehicle. For example, the reference distance range may be a range of 100 m before and after the current position information of the target vehicle, etc. The N traffic vehicles in the target lane may be regarded as moving at a constant speed in an expected lane change time duration. In this case, the predicated position information of each traffic vehicle in the target lane may be expressed as a current position of the traffic vehicle plus a distance traveled at a constant speed in the predicted lane change time duration. By calculating a predicated distance between the target vehicle and each traffic vehicle, a front obstacle and a rear obstacle that are closest to the target predicted position information $s(t_p)$ may be selected as the target obstacle vehicles.

Figure 4:
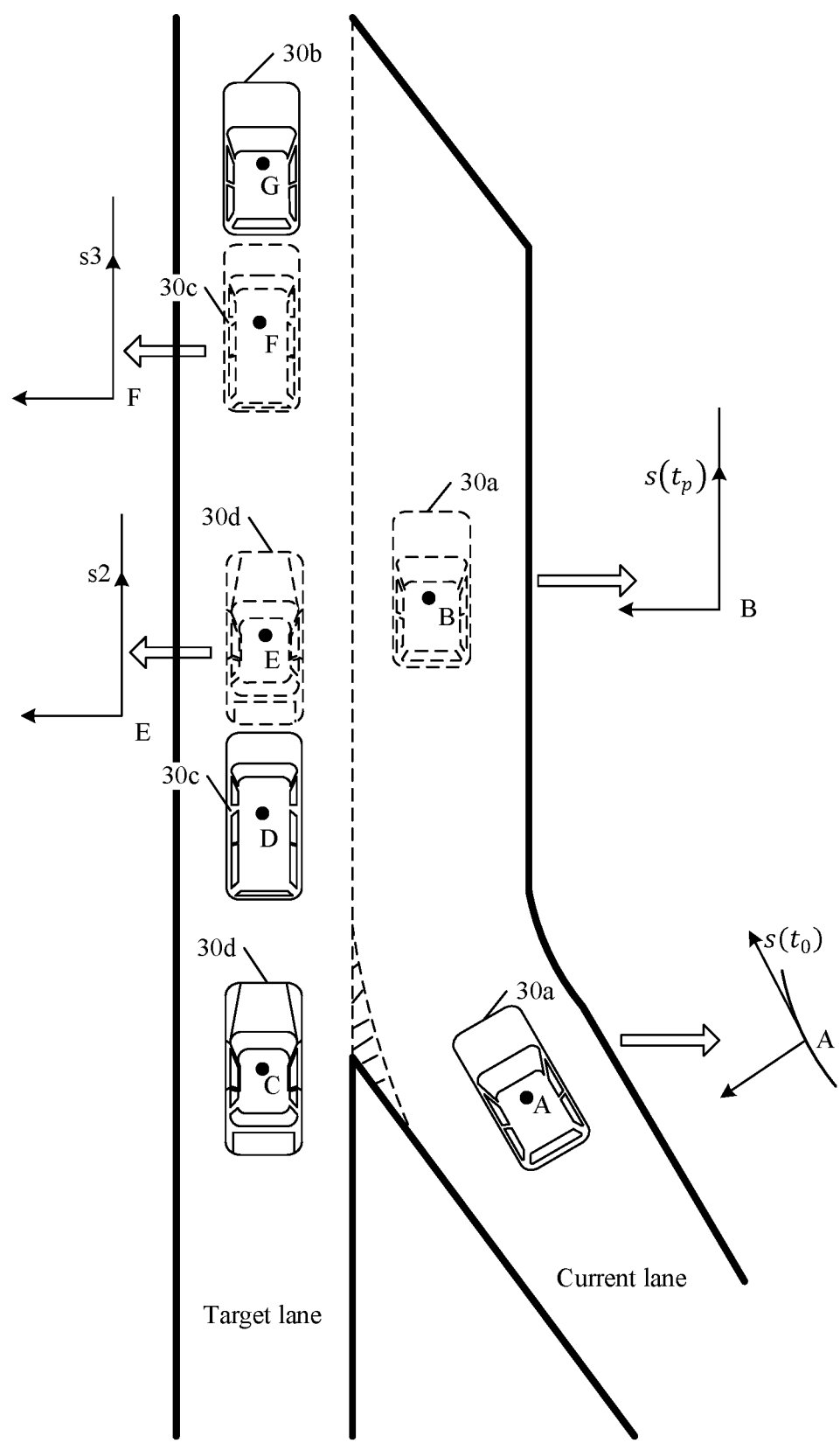
FIG. 4 is a schematic diagram of determining a target obstacle vehicle according to an embodiment of this application.

Referring to FIG. 4 together, FIG. 4 is a schematic diagram of determining a target obstacle vehicle according to an embodiment of this application. A vehicle 30a shown in FIG. 4 is a driverless vehicle needing to change lanes. A position of the vehicle 30a at the current time (i.e., time $t_0$) is a position A of the current lane. A longitudinal position of the position A in the Frenet coordinate system may be represented by $s(t_0)$. Target predicted position information of the vehicle 30a may be calculated as $s(t_p)$ according to the calculated initial predicted lane change acceleration $a_0'$ and predicted lane change time duration $t_p$, and a current driving speed $v_1$ of the vehicle 30a. That is, the vehicle 30a may travel from the position A to a position B in the current lane within the predicted lane change time duration $t_p$. A longitudinal position corresponding to the position B is $s(t_p)$. $s(t_p)$ is the target predicted position information of the vehicle 30a after the predicted lane change time duration $t_p$.

The intelligent driving system may acquire a vehicle 30b, a vehicle 30c, and a vehicle 30d within the reference distance range from the target lane. At the time $t_0$, the vehicle 30b is at a position G in the target lane, the vehicle 30c is at a position D in the target lane, and the vehicle 30d is at a position C in the target lane. Driving speeds of the vehicle 30b, the vehicle 30c, and the vehicle 30d at the time $t_0$ are acquired respectively. Predicted position information respectively corresponding to the vehicle 30b, the vehicle 30c, and the vehicle 30d after the predicted lane change time duration $t_p$ (herein, it is assumed that the vehicle 30b, the vehicle 30c, and the vehicle 30d move at a constant speed in the predicted lane change time duration $t_p$) according to the driving speeds at the time $t_0$ and the predicted lane change time duration $t_p$. As shown in FIG. 4, the vehicle 30c travels from the position D to a position F in the target lane in the predicted lane change time duration $t_p$. A longitudinal position corresponding to the position F is s3 (i.e., predicted position information corresponding to the vehicle 30c). The vehicle 30d travels from the position C to a position E in the target lane in the predicted lane change time duration $t_p$. A longitudinal position corresponding to the position E is s2 (i.e., predicted position information corresponding to the vehicle 30d). By respectively calculating predicted distances between the longitudinal position $s(t_p)$ and the predicted position information corresponding to the vehicle 30b, the vehicle 30c, and the vehicle 30d, it may be determined that the distance between the longitudinal position s2 and the longitudinal position $s(t_p)$ is minimum, and the longitudinal position s2 is lower than the longitudinal position $s(t_p)$. Then, the vehicle 30d corresponding to the longitudinal position s2 may be determined as a target obstacle vehicle corresponding to the vehicle 30a (after the predicted lane change time duration $t_p$, the vehicle 30d is located behind the vehicle 30a), and then the vehicle 30c may also be determined as a target obstacle vehicle corresponding to the vehicle 30a (after the predicted lane change time duration $t_p$, the vehicle 30c is a vehicle in front of and closest to the vehicle 30a).

Step S104. Determine, according to a predicted position relationship between the target obstacle vehicle and the target vehicle, a target predicted lane change acceleration for instructing the target vehicle to change from the current lane to the target lane in replacement of the initial predicted lane change acceleration.

Step S105. Control, according to the target predicted lane change acceleration, the target vehicle to change from the current lane to the target lane.

When the vehicle lane change method according to this embodiment of this application is performed by a server, the server transmits a control instruction to the intelligent driving system in the target vehicle to cause the intelligent driving system to control the target vehicle to change from the current lane to the target lane.

Specifically, it may be understood that the initial predicted lane change acceleration $a_0'$ is used for determining a target obstacle vehicle from the target lane. The influence of the target obstacle vehicle on the lane change of the target vehicle is not considered during the determination of the initial predicted lane change acceleration $a_0'$, and if the target vehicle changes lanes by using the initial predicted lane change acceleration $a_0'$, the target obstacle vehicle cannot be effectively tracked and avoided. Therefore, the intelligent driving system needs to re-plan the speed of the target vehicle based on the target obstacle vehicle.

The intelligent driving system may determine a candidate acceleration $a_4$ corresponding to the target vehicle according to the predicted position relationship between the target obstacle vehicle and the target vehicle. The candidate acceleration $a_4$ refers to an acceleration of the target vehicle obtained according to the target obstacle vehicle. One or two target obstacle vehicles may be provided. When one target obstacle vehicle is provided, the target vehicle may travel in front of the target obstacle vehicle or behind the target obstacle vehicle after the expected lane change. When two target obstacle vehicles are provided, the target vehicle may travel between the two target obstacle vehicles after the expected lane change.

The intelligent driving system may select a minimum value from the candidate acceleration $a_4$, the second limited acceleration $a_2$, and the third limited acceleration $a_3$ as the target predicted lane change acceleration $a_0''$ corresponding to the target vehicle, i.e., $a_0''=\min(a_4, a_2, a_3)$. After obtaining the target predicted lane change acceleration $a_0''$, the intelligent driving system may control the target vehicle to change from the current lane to the target lane according to the target predicted lane change acceleration $a_0''$. It may be understood that, during actual lane change of the target vehicle, the intelligent driving system is further required to plan a lane change path for the target vehicle, and after planning the lane change path, adjust the speed of the target vehicle based on the planned path and according to the target predicted lane change acceleration $a_0''$ to realize the lane change of the target vehicle from the current lane to the target lane. When no target obstacle vehicle exists in the target lane, which indicates that no vehicle is moving within the reference distance range of the target lane, the target vehicle in this case can change from the current lane to the target lane without obstacles. During the determination of the target predicted lane change acceleration $a_0''$, factors such as the leading car, the road passing distance, and the target obstacle vehicle may be simultaneously considered, which can improve accuracy of the target predicted lane change acceleration $a_0''$ and then increase a lane change success rate of the target vehicle.

When one target obstacle vehicle is provided, a process of determining the candidate acceleration $a_4$ may include: acquiring, by the intelligent driving system, a driving speed $v_3$ corresponding to the target obstacle vehicle, and a spacing distance $l_2$ (a spacing distance at the current time) between the target obstacle vehicle and the target vehicle, determining a second safe braking distance $L_{b2}$ corresponding to the target vehicle according to the spacing distance $l_2$, and then determining a candidate acceleration $a_4$ corresponding to the target vehicle according to the driving speed $v_1$, the second safe braking distance $L_{b2}$, and the driving speed $v_3$. The candidate acceleration $a_4$ may be expressed as:

$$a_4 = 2[L_{b2} - (v_1 - v_3) * t_a]/t_a^2 \quad (7)$$

where $t_a$ denotes adjustment time, $t_a$ is a preset constant parameter (e.g., $t_a$=2-4 s) and used for estimating the adjustment time for the target vehicle to change from the current lane to the target lane. The second safe braking distance $L_{b2}$ may be used for representing a distance that can be traveled by the target vehicle in the target lane after the expected lane change when keeping a safe distance from the target obstacle vehicle.

When calculating the second safe braking distance $L_{b2}$, the intelligent driving system may acquire a safe following distance $L_s$ and a second following time interval $t_{h2}$ of the target vehicle after the expected lane change. The safe following distance $L_s$ is a preset constant parameter. The safe following distance $L_s$ is used for representing a safe distance between two adjacent vehicles in the target lane to avoid collision, for example, $L_s$=1.0-3.0 m. The second following time interval $t_{h2}$ may be a preset constant parameter and used for representing a duration in which the target vehicle at a certain driving speed keeps a minimum safe distance from the target obstacle vehicle, for example, $t_{h2}$=0.1-0.5 s, whose meaning is similar to the first following time interval $t_{h1}$.

Figure 5A:
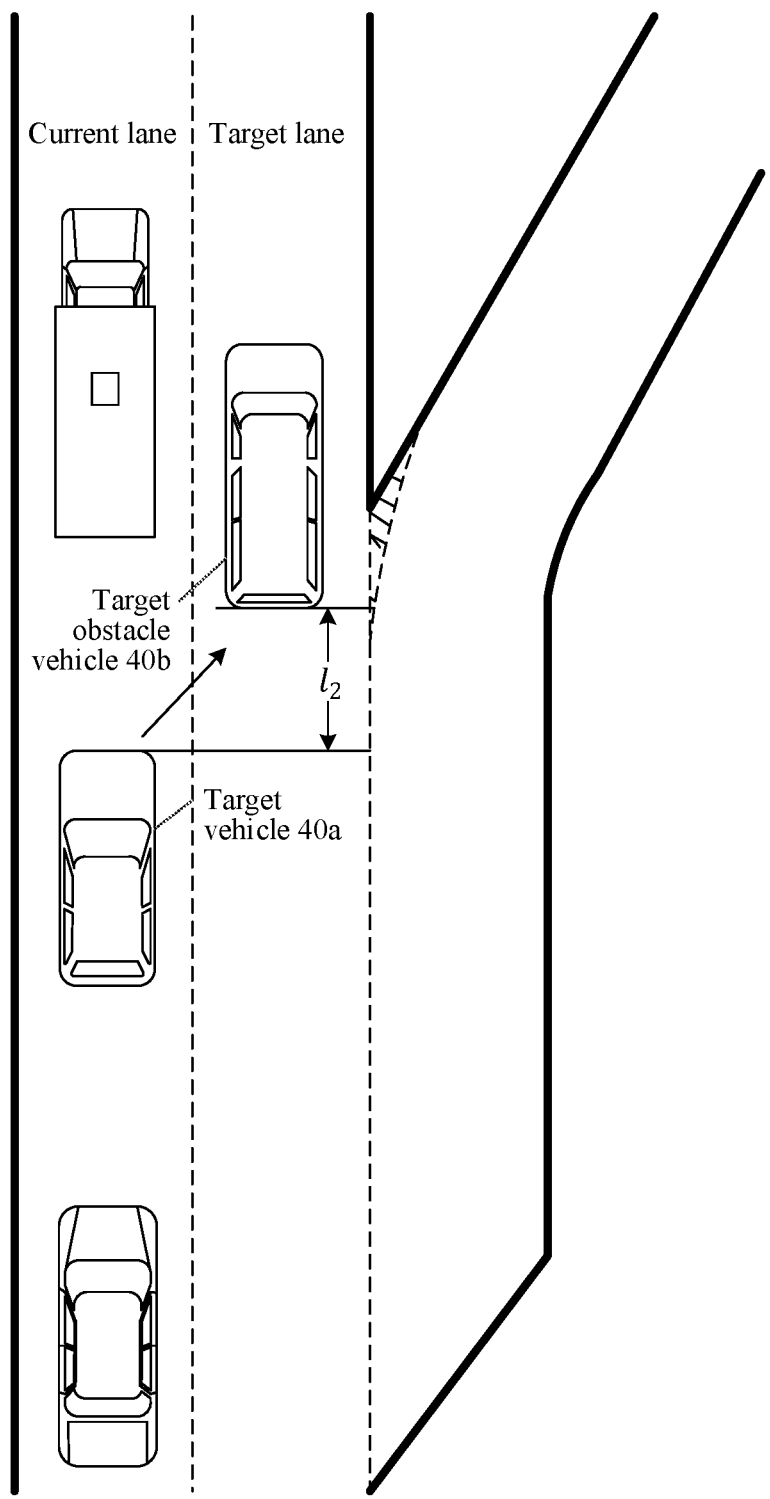
FIG. 5A and FIG. 5B are schematic diagrams of lane change scenarios of a vehicle according to an embodiment of this application.
Figure 5B:
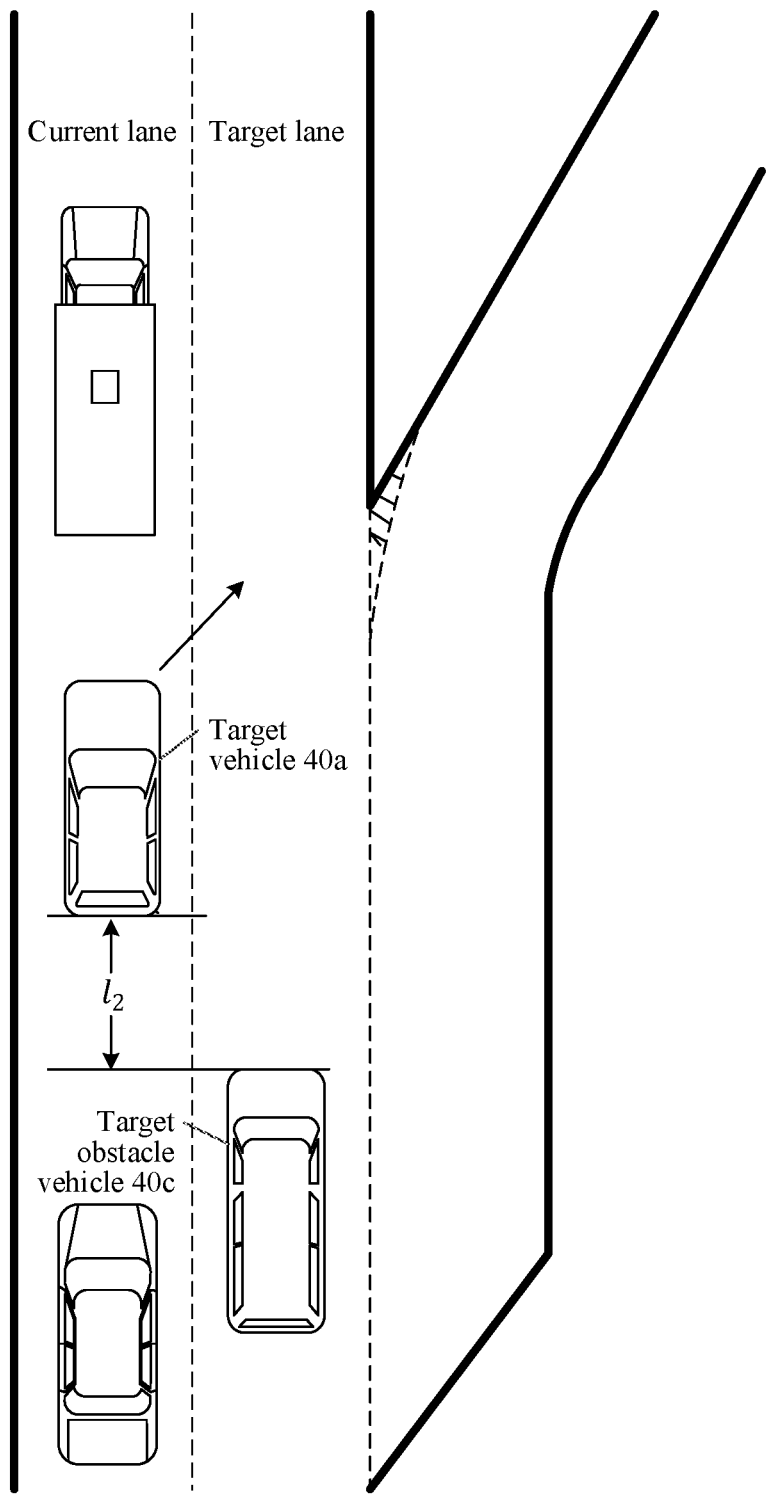

Referring to FIG. 5A and FIG. 5B together, FIG. 5A and FIG. 5B are schematic diagrams of lane change scenarios of a vehicle according to an embodiment of this application. If a front part of the target vehicle after the expected lane change is adjacent to a rear part of the target obstacle vehicle (as shown in FIG. 5A, a target vehicle 40a desires to change from the current lane to the target lane, and only a target obstacle vehicle 40b exists in the target lane), the intelligent driving system may determine the second safe braking distance $L_{b2}$ corresponding to the target vehicle according to the driving speed $v_1$, the second following time interval $t_{h2}$, the safe following distance $L_s$, and the spacing distance $l_2$ (i.e., a spacing distance between the target vehicle 40a and the target obstacle vehicle 40b). The intelligent driving system may predefine a minimum gap distance $g_{m1}$ between the target vehicle 40a and the target obstacle vehicle 40b. The minimum gap distance $g_{m1}$ may be expressed as:

$$g_{m1} = v_1 * t_{h2} + L_s \quad (8)$$

According to the minimum gap distance $g_{m1}$ defined in the equation (8), the second safe braking distance $L_{b2}$ may be determined as:

$$L_{b2} = l_2 - \max(l_2, g_{m1}) \quad (9)$$

As can be known from the equation (8), the second safe braking distance $L_{b2}$ herein is used for representing a relative position between the target vehicle 40a and the target obstacle vehicle 40b. Therefore, the second safe braking distance $L_{b2}$ in this embodiment of this application may be negative. In addition, all the distances referred to in this embodiment of this application may be expressed as a relative position between the two (e.g., two vehicles). Therefore, the calculated distance may be negative. In this case, the negative result is also meaningful, which is not described later. The candidate acceleration $a_4$ in the lane change scenario as shown in FIG. 5A may be determined according to the equation (7), the equation (8), and the equation (9).

In some embodiments, if a front part of the target obstacle vehicle is adjacent to a rear part of the target vehicle after the expected lane change (as shown in FIG. 5B, the target vehicle 40a desires to change from the current lane to the target lane, and only a target obstacle vehicle 40c exists in the target lane), the second safe braking distance $L_{b2}$ corresponding to the target vehicle is determined according to the driving speed $v_3$ (i.e., a driving speed of the target obstacle vehicle 40c at the current time), the second following time interval $t_{h2}$, the safe following distance $L_s$, and the spacing distance $l_2$ (i.e., a spacing distance between the target vehicle 40a and the target obstacle vehicle 40c). The intelligent driving system may predefine a minimum gap distance $g_{m2}$ between the target vehicle 40a and the target obstacle vehicle 40c. The minimum gap distance $g_{m2}$ may be expressed as:

$$g_{m2} = v_3 * t_{h2} + L_s \quad (10)$$

According to the minimum gap distance $g_{m2}$ defined in the equation (10), the second safe braking distance $L_{b2}$ may be determined as:

$$L_{b2} = \max(0, l_2 + g_{m2})$$

The candidate acceleration $a_4$ in the lane change scenario as shown in FIG. 5B may be determined according to the equation (7), the equation (10), and the equation (11).

Figure 6:
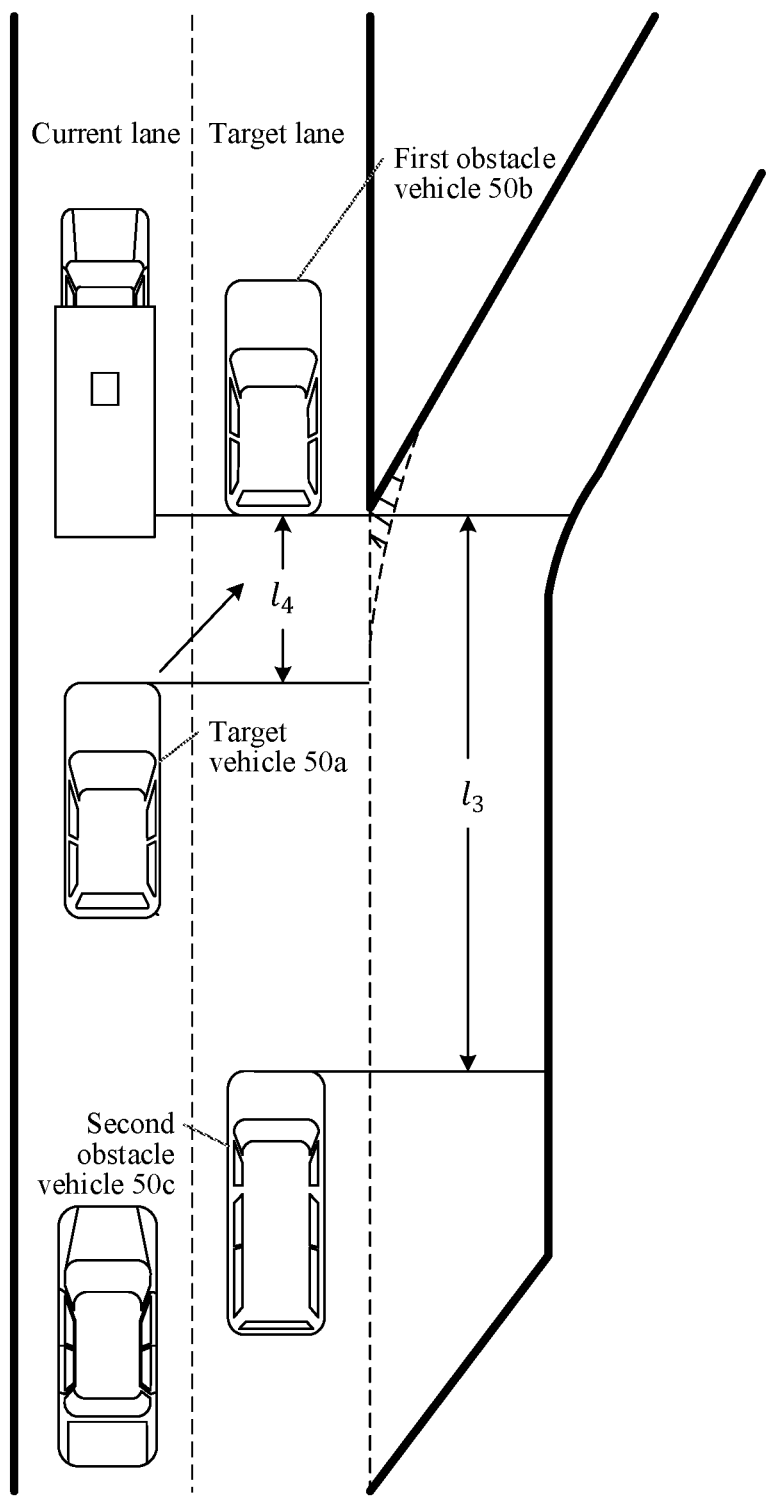
FIG. 6 is a schematic diagram of a lane change scenario of a vehicle according to an embodiment of this application.

In some embodiments, referring to FIG. 6 together, FIG. 6 is a schematic diagram of a lane change scenario of a vehicle according to an embodiment of this application. As shown in FIG. 6, the target obstacle vehicle may include a first obstacle vehicle 50b (which may be referred to as a putative leader) and a second obstacle vehicle 50c (which may be referred to as a putative follower), and a target vehicle 50a after expected lane change travels between the first obstacle vehicle 50b and the second obstacle vehicle 50c. That is, a rear part of the first obstacle vehicle is adjacent to a front part of the target vehicle after the expected lane change, and a front part of the second obstacle vehicle is adjacent to a rear part of the target vehicle after the expected lane change. In this case, two target obstacle vehicles are provided.

In this case, the process of determining the candidate acceleration $a_4$ may include: acquiring, by the intelligent driving system, a spacing distance $l_3$ (at the current time)

between the first obstacle vehicle 50b and the second obstacle vehicle 50c, and determining an estimated safe distance $L_P$ between the target vehicle 50a after the expected lane change and the first obstacle vehicle 50b (i.e., an optimal spacing distance between the target vehicle 50a after the expected lane change and the first obstacle vehicle) according to the spacing distance $l_3$ and a vehicle length $l_0$ of the target vehicle 50a. A spacing distance $l_4$ (at the current time) between the target vehicle 50a and the first obstacle vehicle 50b is acquired. A third safe braking distance $L_{b3}$ corresponding to the target vehicle 50a may be determined according to the spacing distance $l_4$ and the estimated safe distance $L_P$. The intelligent driving system may acquire a driving speed $v_4$ of the first obstacle vehicle 50b, and determine a candidate acceleration $a_4$ corresponding to the target vehicle 50a according to the driving speed $v_1$, the third safe braking distance $L_{b3}$, and the driving speed $v_4$. The candidate acceleration $a_4$ may be expressed as:

$$a_4 = 2[L_{b3} - (v_1 - v_4) * t_a]/t_a^2 \tag{12}$$

The third safe braking distance may be expressed as $L_{b3} = l_4 - L_P$.

A process of determining the estimated safe distance $L_P$ is described below. The intelligent driving system may acquire a safe following distance $L_s$ and a second following time interval $t_{h2}$ of the target vehicle 50a after the expected lane change, and acquire a driving speed $v_5$ corresponding to the second obstacle vehicle 50c. Then, a first expected spacing distance $g_{m3}$ between the first obstacle vehicle 50b and the target vehicle 50a may be determined according to the driving speed $v_1$, the safe following distance $L_s$, and the second following time interval $t_{h2}$. The first expected spacing distance $g_{m3}$ expresses the same meaning as the minimum gap distance $g_{m1}$. That is, an expression of the first expected spacing distance $g_{m3}$ is shown in the equation (8). The intelligent driving system may determine a second expected spacing distance between the second obstacle vehicle 50c and the target vehicle 50a according to the driving speed $v_5$, the safe following distance $L_s$, and the second following time interval $t_{h2}$. The second expected spacing distance $g_{m4}$ may be expressed as $g_{m4} = v_5 * t_{h2} + L_s$.

If the spacing distance $l_3$ is greater than or equal to a first piecewise parameter, the estimated safe distance $L_P$ may be determined according to the spacing distance $l_4$ and the first expected spacing distance $g_{m3}$. The first piecewise parameter refers to a sum of the first expected spacing distance $g_{m3}$, the second expected spacing distance $g_{m4}$, and the vehicle length $l_0$. If the spacing distance $l_3$ is less than the first piecewise parameter and the spacing distance $l_3$ is greater than or equal to a second piecewise parameter, the estimated safe distance $L_P$ may be determined according to a default safe distance $L_{c1}$ (which may refer to a constant parameter preset by the intelligent driving system and be used for representing a minimum retention distance between the target vehicle 50a and the first obstacle vehicle 50b, e.g., $L_{c1} = 0.5\text{-}1.5$ m) between the first obstacle vehicle 50b and the target vehicle 50a, the spacing distance $l_3$, the second expected spacing distance $g_{m4}$, and the vehicle length $l_0$. The second piecewise parameter refers to a sum of the default safe distance $L_{c1}$ between the first obstacle vehicle 50b and the target vehicle 50a, a default safe distance $L_{c2}$ (which may refer to a constant parameter preset by the intelligent driving system and be used for representing a minimum retention distance between the target vehicle 50a and the second obstacle vehicle 50c, e.g., $L_a = 0.5\text{-}1.5$ m) between the second obstacle vehicle 50c and the target vehicle 50a, and the vehicle length $l_0$. If the spacing distance $l_3$ is less than the second piecewise parameter, the default safe distance $L_{c1}$ between the first obstacle vehicle 50b and the target vehicle 50a is determined as the estimated safe distance $L_P$. The estimated safe distance $L_P$ may be expressed as:

$$L_P = \begin{cases} \begin{cases} l_4, & l_4 \geq g_{m3} \text{ and } l_5 \geq g_{m4} \\ g_{m3}, & l_4 < g_{m3} \text{ or } l_5 < g_{m4} \end{cases}, & l_3 \geq g_{m3} + g_{m4} + l_0 \\ \max(L_{c1}, l_3 - g_{m4} - l_0), & L_{c1} + L_{c2} + l_0 \leq l_3 < g_{m3} + g_{m4} + l_0 \\ g_{m3}, & l_3 < L_{c1} + L_{c2} + l_0 \end{cases} \tag{13}$$

where $l_5$ denotes the spacing distance between the target vehicle 50a and the second obstacle vehicle 50c at the current time, $g_{m3} + g_{m4} + l_0$ denotes the first piecewise parameter, and $L_{c1} + L_{c2} + l_0$ denotes the second piecewise parameter. The candidate acceleration $a_4$ in the lane change scenario as shown in FIG. 6 may be determined according to the equation (12) and the equation (13).

In this embodiment of this application, the initial predicted lane change acceleration corresponding to the target vehicle is preliminarily planned through the driving parameters of the target vehicle, an appropriate lane change gap (determined by the target obstacle vehicle) may be determined from the target lane based on the initial predicted lane change acceleration, and after the appropriate lane change gap is determined, the target obstacle vehicle may be taken as a consideration factor (i.e., tracking and avoiding the target obstacle vehicle). By performing the speed planning twice, the target vehicle can obtain a better land change opportunity and improve the land change success rate of the target vehicle.

Figure 7:
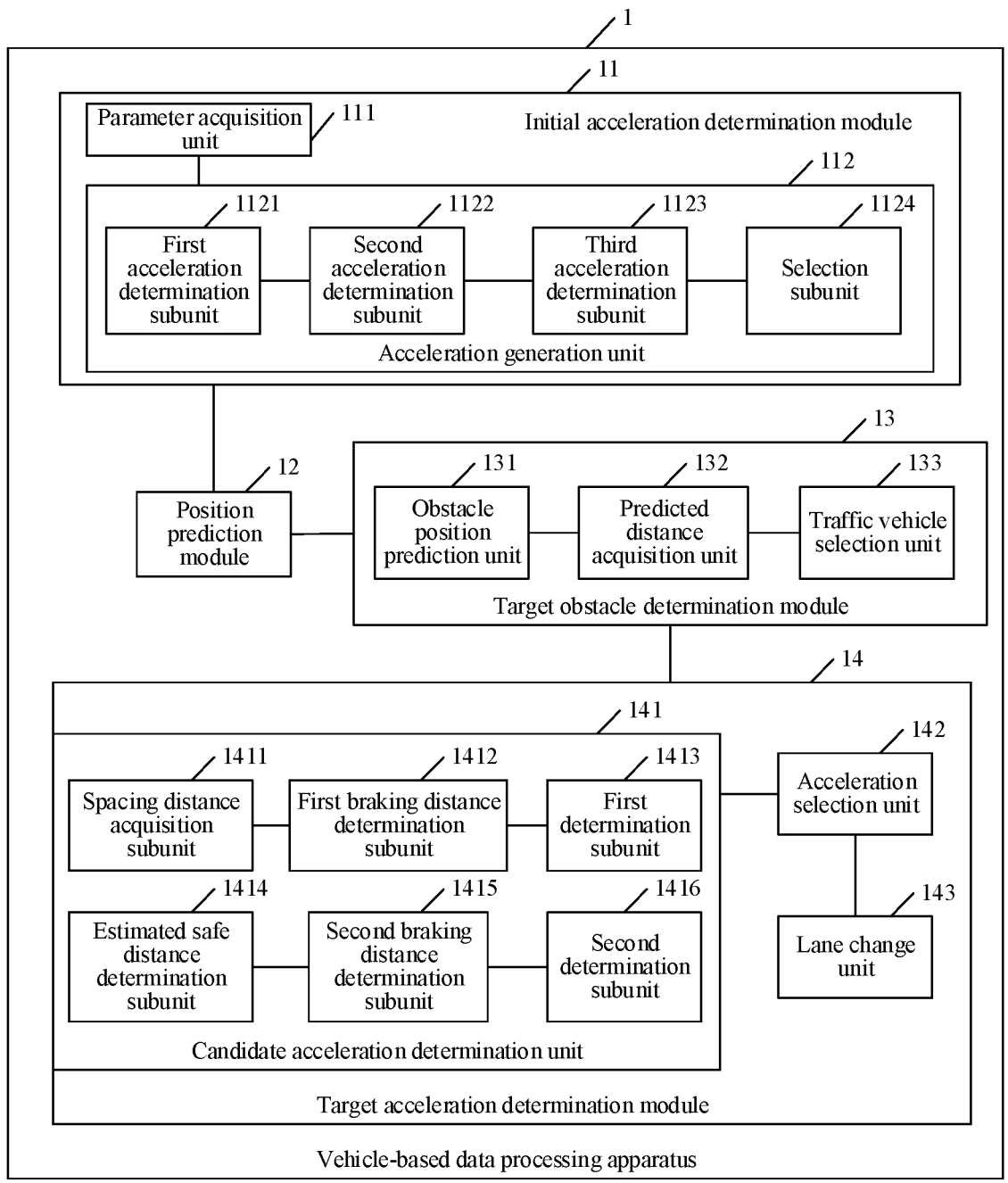
FIG. 7 is a schematic structural diagram of a data processing apparatus according to an embodiment of this application.

Referring to FIG. 7, FIG. 7 is a schematic structural diagram of a data processing apparatus according to an embodiment of this application. As shown in FIG. 7, the data processing apparatus 1 may include: an initial acceleration determination module 11, a position prediction module 12, a target obstacle determination module 13, and a target obstacle determination module 14.

The initial acceleration determination module 11 is configured to acquire driving parameters of a target vehicle in a current lane, and generate an initial predicted lane change acceleration corresponding to the target vehicle according to the driving parameters.

The position prediction module 12 is configured to generate target predicted position information corresponding to the target vehicle according to current position information, a predicted lane change time duration, and the initial predicted lane change acceleration of the target vehicle, the predicted lane change time duration being an estimated time duration taken for the target vehicle to change from the current lane to a target lane.

The target obstacle determination module 13 is configured to determine, in the target lane, a target obstacle vehicle corresponding to the target vehicle according to the target predicted position information. The target lane is a lane to which the target vehicle is expected to change. The target obstacle vehicle is a vehicle in the target lane and adjacent to the target vehicle after the expected lane change.

The target acceleration determination module 14 is configured to determine, according to a predicted position relationship between the target obstacle vehicle and the target vehicle, a target predicted lane change acceleration for instructing the target vehicle to change from the current lane to the target lane; and control, according to the target predicted lane change acceleration, the target vehicle to change from the current lane to the target lane.

Specific function implementations of the initial acceleration determination module 11, the position prediction module 12, the target obstacle determination module 13, and the target obstacle determination module 14 may be obtained with reference to step S101 to step S104 in the embodiment corresponding to FIG. 3. Details are not described here.

Referring to FIG. 7 together, the initial acceleration determination module 11 may include: a parameter acquisition unit 111 and an acceleration generation unit 112.

The parameter acquisition unit 111 is configured to acquire the driving parameters corresponding to the target vehicle. The driving parameters include a maximum target lane speed, a leading car, and a road passing distance. The maximum target lane speed is a maximum speed specified in the target lane. The leading car is a vehicle guiding a driving route for the target vehicle in the current lane. The road passing distance is a length of a passable road in the current lane for the target vehicle.

The acceleration generation unit 112 is configured to generate the initial predicted lane change acceleration corresponding to the target vehicle according to the maximum target lane speed, the leading car, and the road passing distance.

Specific function implementations of the parameter acquisition unit 111 and the acceleration generation unit 112 may be obtained with reference to step S101 in the embodiment corresponding to FIG. 3. Details are not described here.

Referring to FIG. 7 together, the acceleration generation unit 112 may include: a first acceleration determination subunit 1121, a second acceleration determination subunit 1122, a third acceleration determination subunit 1123, and a selection subunit 1124.

The first acceleration determination subunit 1121 is configured to acquire a driving speed $v_1$ of the target vehicle and the maximum target lane speed of the target lane, and determine a first limited acceleration corresponding to the target vehicle according to the driving speed $v_1$ and the maximum target lane speed.

The second acceleration determination subunit 1122 is configured to generate a braking acceleration corresponding to the target vehicle according to the driving speed $v_1$ and the road passing distance, and determine a second limited acceleration corresponding to the target vehicle according to the braking acceleration.

The third acceleration determination subunit 1123 is configured to determine a first safe braking distance corresponding to the target vehicle according to a driving speed $v_2$ of the leading car, and determine a third limited acceleration corresponding to the target vehicle according to the first safe braking distance, the driving speed $v_1$, a target following speed, and an estimated following duration. The target following speed is a smaller value of the maximum target lane speed and the driving speed $v_2$.

The selection subunit 1124 is configured to determine a minimum value of the first limited acceleration, the second limited acceleration, and the third limited acceleration as the initial predicted lane change acceleration corresponding to the target vehicle.

The second acceleration determination subunit 1122 is further configured to:
acquire a road endpoint speed of the target vehicle in the current lane, and acquire a square difference between the driving speed $v_1$ and the road endpoint speed; the road endpoint speed being a minimum speed at which the target vehicle travels to an endpoint of the current lane; and
determine the braking acceleration corresponding to the target vehicle according to a ratio of the square difference to the road passing distance.

The third acceleration determination subunit 1123 is further configured to:
acquire a first following time interval between the target vehicle and the leading car, and determine a target following distance according to the target following speed and the first following time interval; and
acquire a spacing distance $l_1$ between the target vehicle and the leading car, and determine a difference between the spacing distance $l_1$ and the target following distance as the first safe braking distance.

Specific function implementations of the first acceleration determination subunit 1121, the second acceleration determination subunit 1122, the third acceleration determination subunit 1123, and the selection subunit 1124 may be obtained with reference to step S101 in the embodiment corresponding to FIG. 3. Details are not described here.

Referring to FIG. 7 together, the target obstacle determination module 13 may include: an obstacle position prediction unit 131, a predicted distance acquisition unit 132, and a traffic vehicle selection unit 133.

The obstacle position prediction unit 131 is configured to acquire, from the target lane, vehicle driving speeds respectively corresponding to N traffic vehicles within a reference distance range, and determine predicted position information respectively corresponding to the N traffic vehicles according to the vehicle driving speeds and the predicted lane change time duration. N is a positive integer.

The predicted distance acquisition unit 132 is configured to acquire predicted distances between the target vehicle and the N traffic vehicles respectively according to the target predicted position information and the predicted position information respectively corresponding to the N traffic vehicles.

The traffic vehicle selection unit 133 is configured to determine one or more traffic vehicles at a minimum predicted distance from the target vehicle as the target obstacle vehicle corresponding to the target vehicle.

Specific function implementations of the obstacle position prediction unit 131, the predicted distance acquisition unit 132, and the traffic vehicle selection unit 133 may be obtained with reference to step S103 in the embodiment corresponding to FIG. 3. Details are not described here.

Referring to FIG. 7 together, the target acceleration determination module 14 may include: a candidate acceleration determination unit 141, an acceleration selection unit 142, and a lane change unit 143.

The candidate acceleration determination unit 141 is configured to determine a candidate acceleration corresponding to the target vehicle according to the predicted position relationship between the target obstacle vehicle and the target vehicle.

The acceleration selection unit 142 is configured to determine a minimum value of the candidate acceleration, the second limited acceleration, and the third limited acceleration as the target predicted lane change acceleration corresponding to the target vehicle.

The lane change unit 143 is configured to control the target vehicle to change from the current lane to the target lane according to the target predicted lane change acceleration.

Specific function implementations of the candidate acceleration determination unit 141, the acceleration selection unit 142, and the lane change unit 143 may be obtained with reference to step S104 in the embodiment corresponding to FIG. 3. Details are not described here.

Referring to FIG. 7 together, one target obstacle vehicle is provided.

The candidate acceleration determination unit 141 may include: a spacing distance acquisition subunit 1411, a first braking distance determination subunit 1412, and a first determination subunit 1413.

The spacing distance acquisition subunit 1411 is configured to acquire a driving speed $v_3$ corresponding to the target obstacle vehicle, and a spacing distance $l_2$ between the target obstacle vehicle and the target vehicle.

The first braking distance determination subunit 1412 is configured to determine a second safe braking distance corresponding to the target vehicle according to the spacing distance $l_2$.

The first determination subunit 1413 is configured to determine the candidate acceleration corresponding to the target vehicle according to the driving speed $v_1$, the second safe braking distance, and the driving speed $v_3$.

The first braking distance determination subunit 1412 may be further configured to:
  acquire a safe following distance and a second following time interval of the target vehicle after the expected lane change;
  determine the second safe braking distance corresponding to the target vehicle according to the driving speed $v_1$, the second following time interval, the safe following distance, and the spacing distance $l_2$ in response to a front part of the target vehicle after the expected lane change being adjacent to a rear part of the target obstacle vehicle; and
  determine the second safe braking distance corresponding to the target vehicle according to the driving speed $v_3$, the second following time interval, the safe following distance, and the spacing distance $l_2$ in response to a front part of the target obstacle vehicle being adjacent to a rear part of the target vehicle after the expected lane change.

Specific function implementations of the spacing distance acquisition subunit 1411, the first braking distance determination subunit 1412, and the first determination subunit 1413 may be obtained with reference to step S104 in the embodiment corresponding to FIG. 3. Details are not described here.

The target obstacle vehicle includes a first obstacle vehicle and a second obstacle vehicle, a rear part of the first obstacle vehicle is adjacent to the front part of the target vehicle after the expected lane change, and a front part of the second obstacle vehicle is adjacent to the rear part of the target vehicle after the expected lane change.

The candidate acceleration determination unit 141 may include: an estimated safe distance determination subunit 1414, a second braking distance determination subunit 1415, and a second determination subunit 1416.

The estimated safe distance determination subunit 1414 is configured to acquire a spacing distance $l_3$ between the first obstacle vehicle and the second obstacle vehicle, and determine an estimated safe distance between the target vehicle after the expected lane change and the first obstacle vehicle according to the spacing distance $l_3$ and a vehicle length of the target vehicle.

The second braking distance determination subunit 1415 is configured to acquire a spacing distance $l_4$ between the target vehicle and the first obstacle vehicle, and determine a third safe braking distance corresponding to the target vehicle according to the spacing distance $l_4$ and the estimated safe distance.

The second determination subunit 1416 is configured to acquire a driving speed $v_4$ of the first obstacle vehicle, and determine the candidate acceleration corresponding to the target vehicle according to the driving speed $v_1$, the third safe braking distance, and the driving speed $v_4$.

The estimated safe distance determination subunit 1414 may be further configured to:
  acquire a safe following distance and a second following time interval of the target vehicle after the expected lane change, and acquire a driving speed $v_5$ corresponding to the second obstacle vehicle;
  determine a first expected spacing distance between the first obstacle vehicle and the target vehicle according to the driving speed $v_1$, the safe following distance, and the second following time interval;
  determine a second expected spacing distance between the second obstacle vehicle and the target vehicle according to the driving speed $v_5$, the safe following distance, and the second following time interval;
  determine the estimated safe distance according to the spacing distance $l_4$ and the first expected spacing distance in response to the spacing distance $l_3$ being greater than or equal to a first piecewise parameter; the first piecewise parameter being a sum of the first expected spacing distance, the second expected spacing distance, and the vehicle length;
  determine the estimated safe distance according to a default safe distance between the first obstacle vehicle and the target vehicle, the spacing distance $l_3$, the second expected spacing distance, and the vehicle length in response to the spacing distance $l_3$ being less than the first piecewise parameter and the spacing distance $l_3$ being greater than or equal to a second piecewise parameter; the second piecewise parameter being a sum of the default safe distance between the first obstacle vehicle and the target vehicle, a default safe distance between the second obstacle vehicle and the target vehicle, and the vehicle length; and
  determine the default safe distance between the first obstacle vehicle and the target vehicle as the estimated safe distance in response to the spacing distance $l_3$ being less than the second piecewise parameter.

Specific function implementations of the estimated safe distance determination subunit 1414, the second braking distance determination subunit 1415, and the second determination subunit 1416 may be obtained with reference to step S104 in the embodiment corresponding to FIG. 3. Details are not described here. When the spacing distance acquisition subunit 1411, the first braking distance determination subunit 1412, and the first determination subunit 1413 perform corresponding operations, the estimated safe distance determination subunit 1414, the second braking distance determination subunit 1415, and the second determination subunit 1416 suspend the operations. When the estimated safe distance determination subunit 1414, the second braking distance determination subunit 1415, and the second determination subunit 1416 perform corresponding operations, the spacing distance acquisition subunit 1411, the first braking distance determination subunit 1412, and the first determination subunit 1413 suspend the operations.

In this embodiment of this application, the initial predicted lane change acceleration corresponding to the target vehicle is preliminarily planned through the driving parameters of the target vehicle, an appropriate lane change gap (determined by the target obstacle vehicle) may be determined from the target lane based on the initial predicted lane change acceleration, and after the appropriate lane change gap is determined, the target obstacle vehicle may be taken as a consideration factor (i.e., tracking and avoiding the target obstacle vehicle). By performing the speed planning twice, the target vehicle can obtain a better land change opportunity and improve the land change success rate of the target vehicle.

Figure 8:
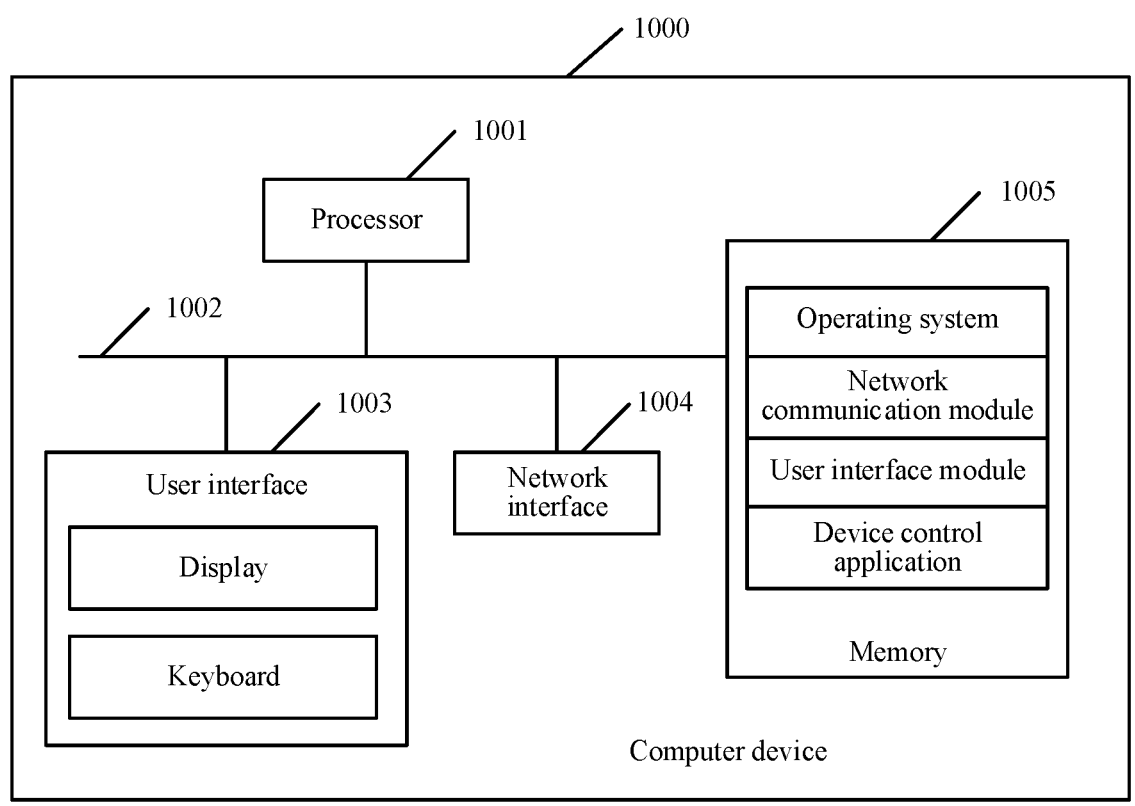
FIG. 8 is a schematic structural diagram of a computer device according to an embodiment of this application.

Referring to FIG. 8, FIG. 8 is a schematic structural diagram of a computer device according to an embodiment of this application. As shown in FIG. 8, the computer device 1000 may include: a processor 1001, a network interface 1004, and a memory 1005. The computer device 1000 may further include: a user interface 1003 and at least one communication bus 1002. The communication bus 1002 is configured to implement connection and communication between these components. The user interface 1003 may include a display and a keyboard. The user interface 1003 may further include a standard wired interface and a standard wireless interface. In some embodiments, the network interface 1004 may include a standard wired interface and a standard wireless interface (such as a Wi-Fi interface). The memory 1005 may be a high-speed RAM, or may be a non-volatile memory, for example, at least one magnetic disk memory. In some embodiments, the memory 1005 may alternatively be at least one storage apparatus located away from the processor 1001. As shown in FIG. 8, the memory 1005 used as a computer-readable storage medium may include an operating system, a network communication module, a user interface module, and a device-control application program.

In the computer device 1000 shown in FIG. 8, the network interface 1004 may provide a network communication function. The user interface 1003 is configured mainly to provide an input interface for a user. The processor 1001 may be configured to invoke a device control application stored in the memory 1005 to implement:

acquiring driving parameters of a target vehicle in a current lane, and generating an initial predicted lane change acceleration corresponding to the target vehicle according to the driving parameters;

generating target predicted position information corresponding to the target vehicle according to current position information, a predicted lane change time duration, and the initial predicted lane change acceleration of the target vehicle;

determining, in the target lane, a target obstacle vehicle corresponding to the target vehicle according to the target predicted position information; the target lane being a lane to which the target vehicle is expected to change, the target obstacle vehicle being a vehicle in the target lane and adjacent to the target vehicle after the expected lane change; and determining, according to a predicted position relationship between the target obstacle vehicle and the target vehicle, a target predicted lane change acceleration for instructing the target vehicle to change from the current lane to the target lane.

It is to be understood that, the computer device 1000 described in this embodiment of this application may implement the descriptions of the data processing method in the embodiment corresponding to FIG. 3, or the descriptions of the data processing apparatus 1 in the embodiment corresponding to FIG. 7. Details are not described herein again. In addition, the description of beneficial effects of the same method is not described herein again.

In addition, an embodiment of this application further provides a computer-readable storage medium. The computer-readable storage medium stores a computer program executed by the data processing apparatus 1 mentioned above, and the computer program includes program instructions. When executing the program instructions, the processor can perform the descriptions of the data processing method in the embodiment corresponding to FIG. 3. Therefore, details are not described herein again. In addition, the description of beneficial effects of the same method is not described herein again. For technical details that are not disclosed in the computer-readable storage medium embodiments of this application, refer to the descriptions of the method embodiments of this application.

In addition, an embodiment of this application further provides a computer program product or a computer program. The computer program product or the computer program may include computer instructions, and the computer instructions may be stored in a computer-readable storage medium. A processor of a computer device reads the computer instructions from the computer-readable storage medium, and may execute the computer instructions, to cause the computer device to perform the descriptions of the data processing method in the embodiment corresponding to FIG. 3. Therefore, details are not described herein again. In addition, the description of beneficial effects of the same method is not described herein again. For technical details that are not disclosed in embodiments of the computer program product or computer program of this application, refer to the descriptions of the method embodiments of this application.

For brief description, the foregoing method embodiments are redisplayed as a series of action combinations. However, a person skilled in the art is to appreciate that this application is not limited to the described order of the actions, because according to this application, some steps may be performed in other orders or simultaneously.

The steps in the method of this embodiment of this application may be performed in other orders, or may be combined and deleted according to actual requirements.

The modules in the apparatus in this embodiment of this application may be combined, divided, and deleted according to actual requirements.

A person of ordinary skill in the art may understand that, all or some of the processes of the method in the foregoing embodiments may be implemented by a computer program instructing relevant hardware. The computer program may be stored in a computer-readable storage medium. During execution of the program, the processes of the foregoing method embodiments may be included. The foregoing storage medium may be a magnetic disk, an optical disc, a read-only memory (ROM), a random access memory (RAM), or the like.

What are disclosed above are merely examples of embodiments of this application, and certainly are not intended to limit the protection scope of this application. Therefore, equivalent variations made in accordance with the claims of this application shall fall within the scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units.

Moreover, each module or unit can be part of an overall module that includes the functionalities of the module or unit.

What is claimed is:

1. A data processing method, performed by a computer device, the method comprising:

acquiring driving parameters of a target vehicle, the driving parameters including a maximum target lane speed, a leading car, and a road passing distance, wherein the maximum target lane speed is a maximum speed specified in a target lane, the leading car is a vehicle traveling in front of and closest to the target vehicle in a current lane of the target vehicle and guiding a driving route for the target vehicle, and the road passing distance is a length of a passable road in the current lane for the target vehicle;

generating an initial predicted lane change acceleration corresponding to the target vehicle according to the maximum target lane speed, the leading car, and the road passing distance;

generating target predicted position information corresponding to the target vehicle according to current position information, a predicted lane change time duration, and the initial predicted lane change acceleration of the target vehicle, the predicted lane change time duration being an estimated time duration taken for the target vehicle to change from the current lane to a target lane, the target lane being a lane to which the target vehicle is expected to change to;

determining a target obstacle vehicle in the target lane corresponding to the target vehicle according to the target predicted position information, the target obstacle vehicle being a vehicle in the target lane and adjacent to the target vehicle after the expected lane change;

updating the initial predicted lane change acceleration to be a target predicted lane change acceleration for instructing the target vehicle to change from the current lane to the target lane according to a predicted position relationship between the target obstacle vehicle and the target vehicle; and controlling, according to the target predicted lane change acceleration, the target vehicle to change from the current lane to the target lane.

2. The method of claim 1, wherein the generating the initial predicted lane change acceleration corresponding to the target vehicle according to the maximum target lane speed, the leading car, and the road passing distance comprises:

acquiring a current driving speed $v_1$ of the target vehicle and the maximum target lane speed of the target lane, and determining a first limited acceleration corresponding to the target vehicle according to the driving speed $v_1$ and the maximum target lane speed;

generating a braking acceleration corresponding to the target vehicle according to the driving speed $v_1$ and the road passing distance, and determining a second limited acceleration corresponding to the target vehicle according to the braking acceleration;

determining a first safe braking distance corresponding to the target vehicle according to a driving speed $v_2$ of the leading car, and determining a third limited acceleration corresponding to the target vehicle according to the first safe braking distance, the driving speed $v_1$, a target following speed, and an estimated following duration; the target following speed being a smaller value of the maximum target lane speed and the driving speed $v_2$; and determining a minimum value of the first limited acceleration, the second limited acceleration, and the third limited acceleration as the initial predicted lane change acceleration corresponding to the target vehicle.

3. The method of claim 2, wherein the generating a braking acceleration corresponding to the target vehicle according to the driving speed $v_1$ and the road passing distance comprises:

acquiring a road endpoint speed of the target vehicle in the current lane, and acquiring a square difference between the driving speed $v_1$ and the road endpoint speed; the road endpoint speed being a minimum speed at which the target vehicle travels to an endpoint of the current lane; and determining the braking acceleration corresponding to the target vehicle according to a ratio of the square difference to the road passing distance.

4. The method of claim 2, wherein the determining a first safe braking distance corresponding to the target vehicle according to a driving speed $v_2$ of the leading car comprises:

acquiring a first following time interval between the target vehicle and the leading car, and determining a target following distance according to the target following speed and the first following time interval; the first following time interval being preset and used for representing a duration in which the target vehicle at the current driving speed $v_1$ keeps a minimum safe distance from the leading car; and acquiring a spacing distance 11 between the target vehicle and the leading car, and determining a difference between the spacing distance 11 and the target following distance as the first safe braking distance.

5. The method of claim 2, wherein the updating the initial predicted lane change acceleration to be a target predicted lane change acceleration for instructing the target vehicle to change from the current lane to the target lane according to a predicted position relationship between the target obstacle vehicle and the target vehicle comprises:

determining a candidate acceleration corresponding to the target vehicle according to the predicted position relationship between the target obstacle vehicle and the target vehicle; and determining a minimum value of the candidate acceleration, the second limited acceleration, and the third limited acceleration as the target predicted lane change acceleration corresponding to the target vehicle.

6. The method of claim 5, wherein the determining a candidate acceleration corresponding to the target vehicle according to the predicted position relationship between the target obstacle vehicle and the target vehicle comprises:

acquiring a driving speed $v_3$ corresponding to the target obstacle vehicle, and a spacing distance $l_2$ between the target obstacle vehicle and the target vehicle;

determining a second safe braking distance corresponding to the target vehicle according to the spacing distance $l_2$; and determining the candidate acceleration corresponding to the target vehicle according to the driving speed $v_1$, the second safe braking distance, and the driving speed $v_3$.

7. The method of claim 6, wherein the determining a second safe braking distance corresponding to the target vehicle according to the spacing distance $l_2$ comprises:

acquiring a safe following distance and a second following time interval of the target vehicle after the expected lane change; the second following time interval being a preset constant parameter and used for representing a duration in which the target vehicle at the current driving speed $v_1$ keeps a minimum safe distance from the target obstacle vehicle; and determining the second safe braking distance corresponding to the target vehicle according to the driving speed $v_1$, the second following time interval, the safe following distance, and the spacing distance $l_2$ in response to a front part of the target vehicle after the expected lane change being adjacent to a rear part of the target obstacle vehicle; and determining the second safe braking distance corresponding to the target vehicle according to the driving speed $v_3$, the second following time interval, the safe following distance, and the spacing distance $l_2$ in response to a front part of the target obstacle vehicle being adjacent to a rear part of the target vehicle after the expected lane change.

8. The method of claim 5, wherein the target obstacle vehicle comprises a first obstacle vehicle and a second obstacle vehicle, a rear part of the first obstacle vehicle being adjacent to a front part of the target vehicle after the expected lane change, a front part of the second obstacle vehicle being adjacent to a rear part of the target vehicle after the expected lane change; and the determining a candidate acceleration corresponding to the target vehicle according to the predicted position relationship between the target obstacle vehicle and the target vehicle comprises:

acquiring a spacing distance $l_3$ between the first obstacle vehicle and the second obstacle vehicle, and determining an estimated safe distance between the target vehicle after the expected lane change and the first obstacle vehicle according to the spacing distance $l_3$ and a vehicle length of the target vehicle;

acquiring a spacing distance $l_4$ between the target vehicle and the first obstacle vehicle, and determining a third safe braking distance corresponding to the target vehicle according to the spacing distance $l_4$ and the estimated safe distance; and acquiring a driving speed $v_4$ of the first obstacle vehicle, and determining the candidate acceleration corresponding to the target vehicle according to the driving speed $v_1$, the third safe braking distance, and the driving speed $v_4$.

9. The method of claim 8, wherein the determining an estimated safe distance between the target vehicle after the expected lane change and the first obstacle vehicle according to the spacing distance $l_3$ and a vehicle length of the target vehicle comprises:

acquiring a safe following distance and a second following time interval of the target vehicle after the expected lane change, and acquiring a driving speed $v_5$ corresponding to the second obstacle vehicle;

determining a first expected spacing distance between the first obstacle vehicle and the target vehicle according to the driving speed $v_1$, the safe following distance, and the second following time interval;

determining a second expected spacing distance between the second obstacle vehicle and the target vehicle according to the driving speed $v_5$, the safe following distance, and the second following time interval;

determining the estimated safe distance according to the spacing distance $l_4$ and the first expected spacing distance in response to the spacing distance $l_3$ being greater than or equal to a first piecewise parameter; the first piecewise parameter being a sum of the first expected spacing distance, the second expected spacing distance, and the vehicle length;

determining the estimated safe distance according to a default safe distance between the first obstacle vehicle and the target vehicle, the spacing distance $l_3$, the second expected spacing distance, and the vehicle length in response to the spacing distance $l_3$ being less than the first piecewise parameter and the spacing distance $l_3$ being greater than or equal to a second piecewise parameter; the second piecewise parameter being a sum of the default safe distance between the first obstacle vehicle and the target vehicle, a default safe distance between the second obstacle vehicle and the target vehicle, and the vehicle length; and determining the default safe distance between the first obstacle vehicle and the target vehicle as the estimated safe distance in response to the spacing distance $l_3$ being less than the second piecewise parameter.

10. The method of claim 1, wherein the determining a target obstacle vehicle in the target lane corresponding to the target vehicle according to the target predicted position information comprises:

acquiring, from the target lane, vehicle driving speeds respectively corresponding to N traffic vehicles within a reference distance range, and determining predicted position information respectively corresponding to the N traffic vehicles according to the vehicle driving speeds and the predicted lane change time duration; N being a positive integer;

acquiring predicted distances between the target vehicle and the N traffic vehicles respectively according to the target predicted position information and the predicted position information respectively corresponding to the N traffic vehicles; and determining one or more traffic vehicles at a minimum predicted distance from the target vehicle as the target obstacle vehicle corresponding to the target vehicle.

11. A computer device, comprising a memory and a processor, the memory storing a computer program, the computer program, when executed by the processor, causing the computer device to perform a data processing method including:

acquiring driving parameters of a target vehicle, the driving parameters including a maximum target lane speed, a leading car, and a road passing distance, wherein the maximum target lane speed is a maximum speed specified in a target lane, the leading car is a vehicle traveling in front of and closest to the target vehicle in a current lane of the target vehicle and guiding a driving route for the target vehicle, and the road passing distance is a length of a passable road in the current lane for the target vehicle;

generating an initial predicted lane change acceleration corresponding to the target vehicle according to the maximum target lane speed, the leading car, and the road passing distance;

generating target predicted position information corresponding to the target vehicle according to current position information, a predicted lane change time duration, and the initial predicted lane change acceleration of the target vehicle, the predicted lane change time duration being an estimated time duration taken for the target vehicle to change from the current lane to a target lane, the target lane being a lane to which the target vehicle is expected to change to;

determining a target obstacle vehicle in the target lane corresponding to the target vehicle according to the target predicted position information, the target obstacle vehicle being a vehicle in the target lane and adjacent to the target vehicle after the expected lane change;

updating the initial predicted lane change acceleration to be a target predicted lane change acceleration for instructing the target vehicle to change from the current lane to the target lane according to a predicted position relationship between the target obstacle vehicle and the target vehicle; and controlling, according to the target predicted lane change acceleration, the target vehicle to change from the current lane to the target lane.

12. The computer device of claim 11, wherein the generating the initial predicted lane change acceleration corresponding to the target vehicle according to the maximum target lane speed, the leading car, and the road passing distance comprises:

acquiring a current driving speed $v_1$ of the target vehicle and the maximum target lane speed of the target lane, and determining a first limited acceleration corresponding to the target vehicle according to the driving speed $v_1$ and the maximum target lane speed;

generating a braking acceleration corresponding to the target vehicle according to the driving speed $v_1$ and the road passing distance, and determining a second limited acceleration corresponding to the target vehicle according to the braking acceleration;

determining a first safe braking distance corresponding to the target vehicle according to a driving speed $v_2$ of the leading car, and determining a third limited acceleration corresponding to the target vehicle according to the first safe braking distance, the driving speed $v_1$, a target following speed, and an estimated following duration; the target following speed being a smaller value of the maximum target lane speed and the driving speed $v_2$; and determining a minimum value of the first limited acceleration, the second limited acceleration, and the third limited acceleration as the initial predicted lane change acceleration corresponding to the target vehicle.

13. The computer device of claim 12, wherein the generating a braking acceleration corresponding to the target vehicle according to the driving speed $v_1$ and the road passing distance comprises:

acquiring a road endpoint speed of the target vehicle in the current lane, and acquiring a square difference between the driving speed $v_1$ and the road endpoint speed; the road endpoint speed being a minimum speed at which the target vehicle travels to an endpoint of the current lane; and determining the braking acceleration corresponding to the target vehicle according to a ratio of the square difference to the road passing distance.

14. The computer device of claim 12, wherein the determining a first safe braking distance corresponding to the target vehicle according to a driving speed $v_2$ of the leading car comprises:

acquiring a first following time interval between the target vehicle and the leading car, and determining a target following distance according to the target following speed and the first following time interval; the first following time interval being preset and used for representing a duration in which the target vehicle at the current driving speed $v_1$ keeps a minimum safe distance from the leading car; and acquiring a spacing distance $l_1$ between the target vehicle and the leading car, and determining a difference between the spacing distance $l_1$ and the target following distance as the first safe braking distance.

15. The computer device of claim 11, wherein the determining a target obstacle vehicle in the target lane corresponding to the target vehicle according to the target predicted position information comprises:

acquiring, from the target lane, vehicle driving speeds respectively corresponding to N traffic vehicles within a reference distance range, and determining predicted position information respectively corresponding to the N traffic vehicles according to the vehicle driving speeds and the predicted lane change time duration; N being a positive integer;

acquiring predicted distances between the target vehicle and the N traffic vehicles respectively according to the target predicted position information and the predicted position information respectively corresponding to the N traffic vehicles; and determining one or more traffic vehicles at a minimum predicted distance from the target vehicle as the target obstacle vehicle corresponding to the target vehicle.

16. A non-transitory computer-readable storage medium storing a computer program, the computer program comprising program instructions which, when executed by a processor of a computer device, causing the computer device to perform a data processing method including:

acquiring driving parameters of a target vehicle, the driving parameters including a maximum target lane speed, a leading car, and a road passing distance, wherein the maximum target lane speed is a maximum speed specified in a target lane, the leading car is a vehicle traveling in front of and closest to the target vehicle in a current lane of the target vehicle and guiding a driving route for the target vehicle, and the road passing distance is a length of a passable road in the current lane for the target vehicle;

generating an initial predicted lane change acceleration corresponding to the target vehicle according to the maximum target lane speed, the leading car, and the road passing distance;

generating target predicted position information corresponding to the target vehicle according to current position information, a predicted lane change time duration, and the initial predicted lane change acceleration of the target vehicle, the predicted lane change time duration being an estimated time duration taken for the target vehicle to change from the current lane to a target lane, the target lane being a lane to which the target vehicle is expected to change to;

determining a target obstacle vehicle in the target lane corresponding to the target vehicle according to the target predicted position information, the target obstacle vehicle being a vehicle in the target lane and adjacent to the target vehicle after the expected lane change;

updating the initial predicted lane change acceleration to be a target predicted lane change acceleration for instructing the target vehicle to change from the current lane to the target lane according to a predicted position relationship between the target obstacle vehicle and the target vehicle; and controlling, according to the target predicted lane change acceleration, the target vehicle to change from the current lane to the target lane.

17. The non-transitory computer-readable storage medium of claim 16, wherein the generating the initial predicted lane change acceleration corresponding to the target vehicle according to the maximum target lane speed, the leading car, and the road passing distance comprises:

acquiring a current driving speed $v_1$ of the target vehicle and the maximum target lane speed of the target lane, and determining a first limited acceleration corresponding to the target vehicle according to the driving speed $v_1$ and the maximum target lane speed;

generating a braking acceleration corresponding to the target vehicle according to the driving speed $v_1$ and the road passing distance, and determining a second limited acceleration corresponding to the target vehicle according to the braking acceleration;

determining a first safe braking distance corresponding to the target vehicle according to a driving speed $v_2$ of the leading car, and determining a third limited acceleration corresponding to the target vehicle according to the first safe braking distance, the driving speed $v_1$, a target following speed, and an estimated following duration; the target following speed being a smaller value of the maximum target lane speed and the driving speed $v_2$; and determining a minimum value of the first limited acceleration, the second limited acceleration, and the third limited acceleration as the initial predicted lane change acceleration corresponding to the target vehicle.

18. The non-transitory computer-readable storage medium of claim 17, wherein the generating a braking acceleration corresponding to the target vehicle according to the driving speed $v_1$ and the road passing distance comprises:

acquiring a road endpoint speed of the target vehicle in the current lane, and acquiring a square difference between the driving speed $v_1$ and the road endpoint speed; the road endpoint speed being a minimum speed at which the target vehicle travels to an endpoint of the current lane; and determining the braking acceleration corresponding to the target vehicle according to a ratio of the square difference to the road passing distance.

19. The non-transitory computer-readable storage medium of claim 17, wherein the determining a first safe braking distance corresponding to the target vehicle according to a driving speed $v_2$ of the leading car comprises:

acquiring a first following time interval between the target vehicle and the leading car, and determining a target following distance according to the target following speed and the first following time interval; the first following time interval being preset and used for representing a duration in which the target vehicle at the current driving speed $v_1$ keeps a minimum safe distance from the leading car; and acquiring a spacing distance $l_1$ between the target vehicle and the leading car, and determining a difference between the spacing distance $l_1$ and the target following distance as the first safe braking distance.

20. The non-transitory computer-readable storage medium of claim 16, wherein the determining a target obstacle vehicle in the target lane corresponding to the target vehicle according to the target predicted position information comprises:

acquiring, from the target lane, vehicle driving speeds respectively corresponding to N traffic vehicles within a reference distance range, and determining predicted position information respectively corresponding to the N traffic vehicles according to the vehicle driving speeds and the predicted lane change time duration; N being a positive integer;

acquiring predicted distances between the target vehicle and the N traffic vehicles respectively according to the target predicted position information and the predicted position information respectively corresponding to the N traffic vehicles; and determining one or more traffic vehicles at a minimum predicted distance from the target vehicle as the target obstacle vehicle corresponding to the target vehicle.

* * * * *